(12) United States Patent
Yamada

(10) Patent No.: US 9,584,684 B2
(45) Date of Patent: Feb. 28, 2017

(54) IMAGE FORMING APPARATUS, METHOD FOR CONTROLLING THE SAME, AND STORAGE MEDIUM

(71) Applicant: CANON KABUSHIKI KAISHA, Tokyo (JP)

(72) Inventor: Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/663,948

(22) Filed: Mar. 20, 2015

(65) Prior Publication Data
US 2015/0281489 A1 Oct. 1, 2015

(30) Foreign Application Priority Data

Mar. 28, 2014 (JP) ................. 2014-070083

(51) Int. Cl.
H04N 1/04 (2006.01)
H04N 1/00 (2006.01)
(52) U.S. Cl.
CPC ..... H04N 1/00681 (2013.01); H04N 1/00631 (2013.01); H04N 1/00633 (2013.01); H04N 1/00636 (2013.01); H04N 1/00689 (2013.01); H04N 1/00724 (2013.01)

(58) Field of Classification Search
CPC .................................................. H04N 1/00681
USPC ................... 358/1.5, 1.9, 1.15, 474
See application file for complete search history.

(56) References Cited

U.S. PATENT DOCUMENTS

| | | | | |
|---|---|---|---|---|
| 5,608,493 A * | 3/1997 | Tanaka | ............... | H04N 1/00968 382/317 |
| 2009/0141307 A1* | 6/2009 | Slijp | .................. | H04N 1/00225 358/1.15 |
| 2009/0295074 A1* | 12/2009 | Uchiyama | .............. | B65H 31/10 271/220 |
| 2010/0321706 A1* | 12/2010 | Mori | .................. | G03G 15/6508 358/1.5 |
| 2011/0075231 A1* | 3/2011 | Tohnai | ............... | H04N 1/00408 358/498 |
| 2012/0001387 A1* | 1/2012 | Mutsuno | ................ | B65H 31/24 271/298 |

FOREIGN PATENT DOCUMENTS

JP 2009-091092 A 4/2009

* cited by examiner

Primary Examiner — Houshang Safaipour
(74) Attorney, Agent, or Firm — Fitzpatrick, Cella, Harper & Scinto

(57) ABSTRACT

Provided is a mechanism for setting whether to enable a shift function for shifting the sheet on which the image is printed in accordance with detection of the original.

13 Claims, 20 Drawing Sheets

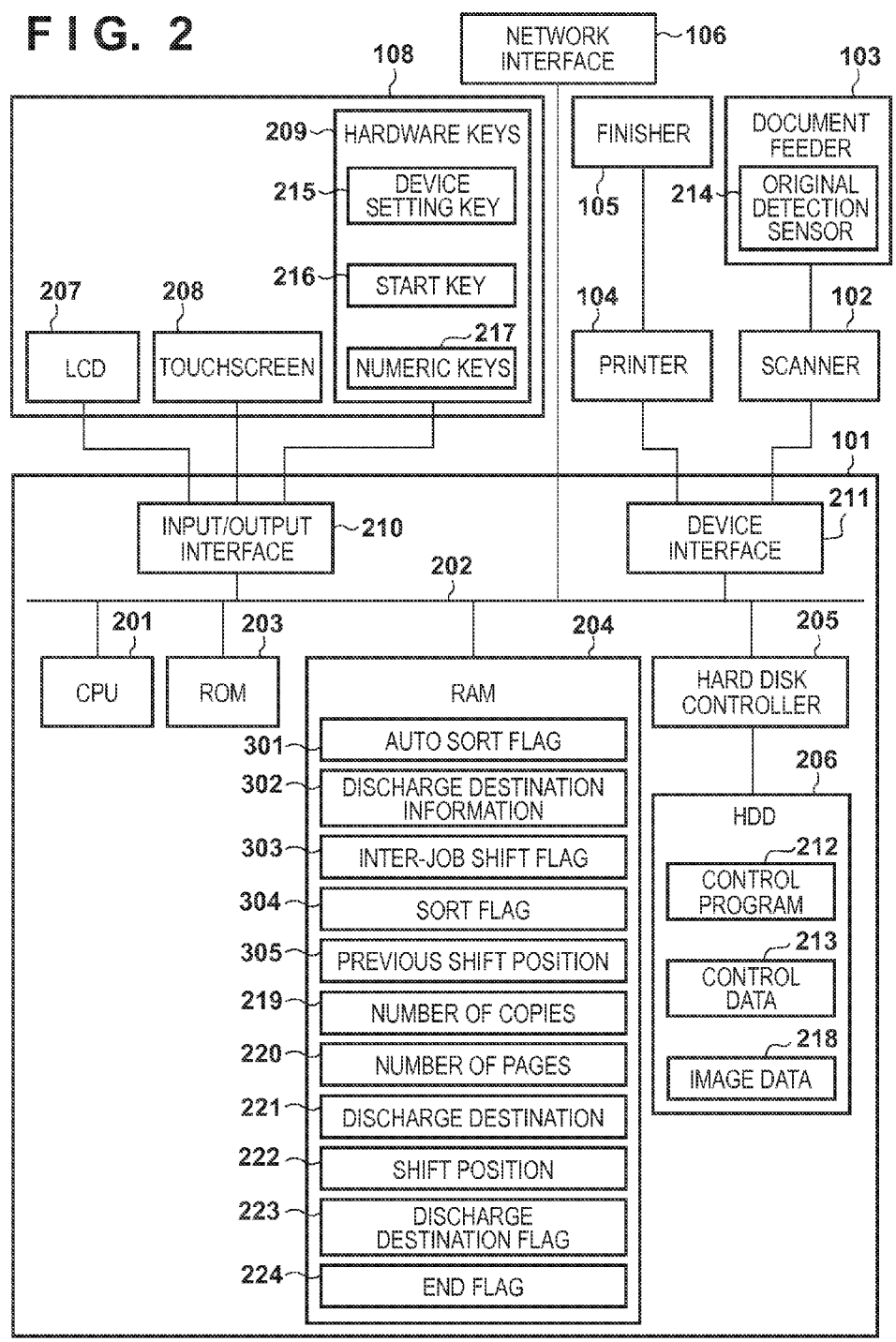

IMAGE FORMING APPARATUS, METHOD FOR CONTROLLING THE SAME, AND STORAGE MEDIUM

BACKGROUND OF THE INVENTION

Field of the Invention

The present invention relates to an image forming apparatus, a method for controlling the same, and a storage medium.

Description of the Related Art

Some image forming apparatuses have a plurality of discharge destinations (discharge trays), and can set which of the discharge destinations to be use and set the priority orders of the discharge destinations on a job-by-job basis. Assume, for example, an image forming apparatus with three discharge destinations (discharge trays 1, 2, 3), in which the priority orders of the discharge destinations in a copy job are as follows: the discharge tray 2 is given the first priority, the discharge tray 1 is given the second priority, and the discharge tray 3 is given the third priority. In this case, printouts of a copy job are discharged to the discharge tray 2, unless there is any particular reason. In the case where the function and the sheet type set for a copy job are not fit for the discharge tray 2 but are fit for the discharge tray 1, discharge is performed using the discharge tray 1, which comes second in the priority order.

Meanwhile, some discharge trays have a shift function, which is one of discharge functions. Shift is a function for outputting printouts such that they are shifted by approximately 1 cm on a copy-by-copy basis, thereby making it easy to sort the printouts. As a user is less likely to recognize the shift function as something that should be manually set, the shift function is generally set with preset values (default). Some discharge trays have the shift function while others do not have such a shift function; therefore, there are cases in which the designated priority orders of discharge destinations contradict the shift setting. In the case where a discharge destination that cannot perform shift and the shift function are designated concurrently, control may be performed so as to place priority on discharge using the designated discharge destination, that is to say, perform discharge without performing shift (priority on the discharge destination).

Japanese Patent Laid-Open No. 2009-91092 proposes a technique to enable acceptance or appropriate handling by a sheet post-processing apparatus even if there is a discrepancy in the settings of "processing" and "discharge destination" transmitted from an image forming apparatus.

However, the foregoing conventional techniques have the following problems. For example, in the case where the shift function is designated with preset values, even if a discharge tray that cannot perform shift has a high priority order, placing priority on the shift function results in discharge using a discharge tray that can perform shift unless the user specifically cancels the shift. That is to say, even in the case where the discharge destination and the discharge destination priority orders set by the user are designated, there is a possibility that printouts are not output to a desired discharge destination. On the other hand, as stated earlier, if control is performed to place priority on the discharge destination, even in the case where the user wishes to use the shift function, there is a possibility that printouts are discharged without being shifted unless a discharge destination having a high priority order does not have the shift function.

SUMMARY OF THE INVENTION

The present invention enables realization of a mechanism for setting whether to enable a shift function for shifting the sheet on which the image is printed in accordance with detection of the original.

One aspect of the present invention provides an image forming apparatus, comprising: a detecting unit configured to detect an original; a reading unit configured to read an image of the original detected by the detecting unit; a printing unit configured to print the image read by the reading unit on a sheet; and a setting unit configured to set whether to enable a shift function for shifting the sheet on which the image is printed by the printing unit in accordance with detection of the original by the detecting unit.

Another aspect of the present invention provides a control method for controlling an image forming apparatus, comprising: detecting an original; reading an image of the detected original; printing the read image on a sheet; and setting whether to enable a shift function for shifting the sheet on which the image is printed in accordance with detection of the original.

Still another aspect of the present invention provides a non-transitory computer readable storage medium for storing a computer program for executing a control method for controlling an image forming apparatus, the computer program comprising: a code to detect an original; a code to read an image of the detected original; a code to print the read image on a sheet; and a code to set whether to enable a shift function for shifting the sheet on which the image is printed in accordance with detection of the original.

Further features of the present invention will be apparent from the following description of exemplary embodiments with reference to the attached drawings.

BRIEF DESCRIPTION OF THE DRAWINGS

FIG. 2 shows a configuration of a controller according to the first embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Image Forming Apparatus

Figure 1A:
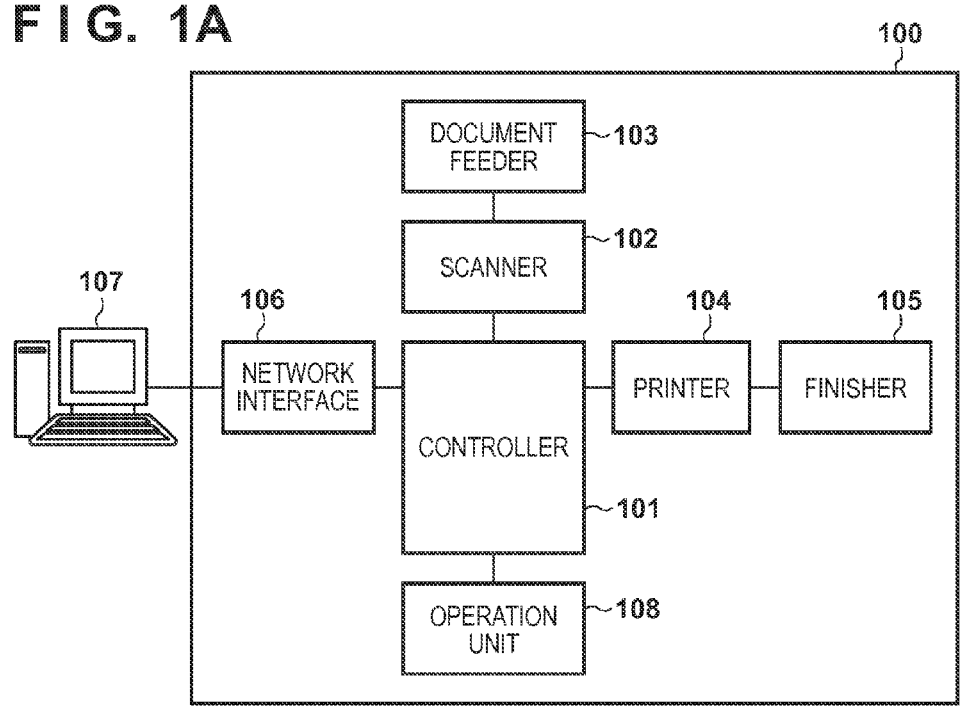
FIGS. 1A and 1B show a hardware configuration of an image forming apparatus according to a first embodiment.
Figure 1B:
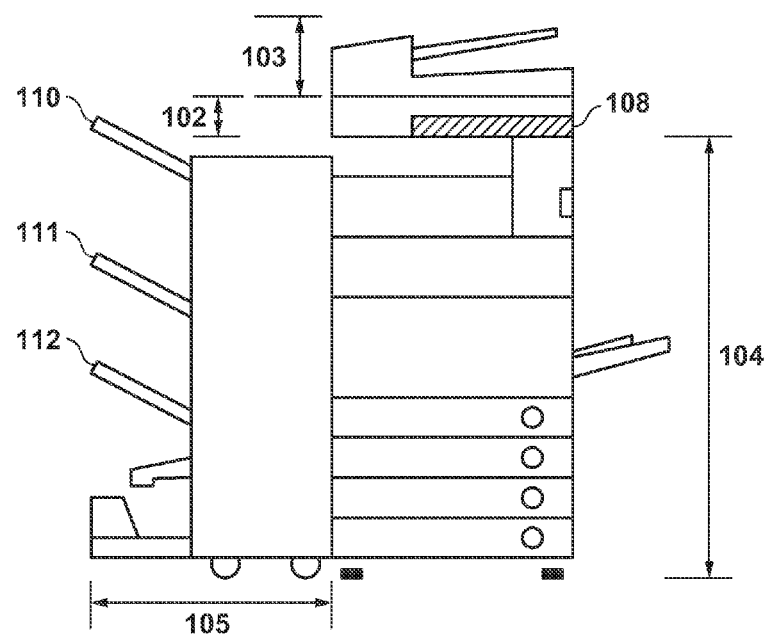

The following describes a first embodiment of the present invention with reference to FIGS. 1A to 15. First, with reference to FIGS. 1A and 1B, a description is given of a hardware configuration of an image forming apparatus according to the present embodiment. A multi-function peripheral (MFP) 100 will be described as an example of the image forming apparatus according to the present embodiment. FIGS. 1A and 1B respectively show the configuration and appearance of the MFP 100.

The MFP 100 includes a controller 101, a scanner 102, a document feeder 103, a printer 104, a finisher 105, and a network interface 106. The controller 101 controls the MFP 100 and has a hardware configuration shown in FIG. 2. The scanner engine 102 is controlled by the controller 101 and reads images from the originals. The document feeder 103 is controlled by the controller 101 and sends the originals to be read to the scanner engine 102, one by one.

The printer 104 is controlled by the controller 101, is connected to the finisher 105, and outputs recording mediums (for example, sheets of paper) on which printing has been conducted to the finisher 105. The finisher 105 can collectively staple and shift a plurality of recording mediums output from the printer 104. The finisher 105 is also controlled by the controller 101.

The network (Ethernet) interface 106 provides the controller 101 with bidirectional communication via itself, and is connected to a personal computer 107 via a network. An operation unit 108 displays information from the controller 101, accepts user input, and notifies the controller 101 of the user input.

As shown in FIG. 1B, the finisher 105 is provided with three discharge trays 110, 111, 112 as discharge destinations of recording mediums. The discharge tray 110 does not have a shift function, whereas the discharge trays 111, 112 have the shift function.

<Configuration of Controller>

With reference to FIG. 2, a description is now given of a configuration of the controller 101 of the MFP 100 according to the present embodiment. The controller 101 includes a CPU 201, a ROM 203, a RAM 204, a hard disk controller 205, an HDD 206, an input/output interface 210, and a device interface 211. The CPU 201 is a central processing unit that controls the entirety of the present apparatus. The CPU 201 is connected to various components by a bus 202, such as a data bus. The ROM 203 stores fixed programs and data, such as a boot program and BIOS. The RAM 204 is a main storage apparatus, and functions as a working memory that provides a working area for the execution of processing by the CPU 201. The RAM 204 stores an auto sort flag (auto setting flag) 301, discharge destination information 302, an inter-job shift flag 303, a sort flag 304, and a previous shift position 305. The RAM 204 also stores the number of copies 219, the number of pages 220, a discharge destination 221, a shift position 222, a discharge destination flag 223, and an end flag 224. The details of these pieces of information will be described later.

The hard disk controller 205 controls the hard disk apparatus (HDD) 206, which is an example of a storage device, so as to store various types of data into the HDD 206 and retrieve stored data. This HDD 206 stores a control program 212 for controlling the entirety of this system, control data 213, image data 218, and the like.

A liquid crystal display (LCD) 207 is an example of a display unit, and displays virtual keys (hereinafter referred to as buttons) and information to be presented to a user. A touchscreen 208 is arranged on the upper surface of the LCD 207, and detects the positions (coordinates) of the operations made by the user with respect to the above-mentioned buttons. Hardware keys 209 are a plurality of keys (switches) constituted by hardware items. The LCD 207, the touchscreen 208, and the hardware keys 209 constitute the operation unit 108 shown in FIGS. 1A and 1B. A device setting key 215, a start key 216, and numeric keys 217 are included as the hardware keys 209.

The input/output interface 210 is intended to connect to the LCD 207, the touchscreen 208, and the hardware keys 209. The device interface 211 is intended to connect to the printer 104 and the scanner 102. The CPU 201 controls the printer 104 and the scanner 102 via the device interface 211. In addition, the device statuses of the printer 104 and the scanner 102 are transferred to the CPU 201 via the device interface 211. The device interface 211 may be something simple, such as an interrupt controller, or may be configured to be highly independent with a complicated internal control mechanism. In either case, the CPU 201 processes the device statuses transferred from the printer 104 and the scanner 102 as events. The CPU 201 also performs control and device status detection with regard to the finisher 105 and the document feeder 103 via the device interface 211, similarly to the printer 104 and the scanner 102. The document feeder 103 is provided with an original detection sensor 214.

<Event Detection Processing>

The following describes the processing flows of the apparatus according to the present embodiment using flowcharts. The substances of the flowcharts described below are recorded as control programs in one of the ROM 203, RAM 204, and HDD 206, and sequentially read and executed by the CPU 201. First, with reference to FIG. 3, a description is given of processing for the case in which a change in the device status has been received as an event.

In step S101, the CPU 201 detects a change in the device status as an event. Subsequently, in step S102, the CPU 201 determines the type of the event detected in step S101. The event types assumed here include pressing of the device setting key, pressing of a finish button, detection of the originals, pressing of the numeric keys, pressing of the start key, and reception of a print request.

If the event detected in step S101 is pressing of the device setting key 215, the processing proceeds to step S103. The device setting key 215 is included among the hardware keys provided in the operation unit 108. The user's pressing of the device setting key 215 is detected by the CPU 201, via the input/output interface 210, as a device setting key pressing event. The details of step S103 will be described later with reference to FIG. 4.

Figure 11:
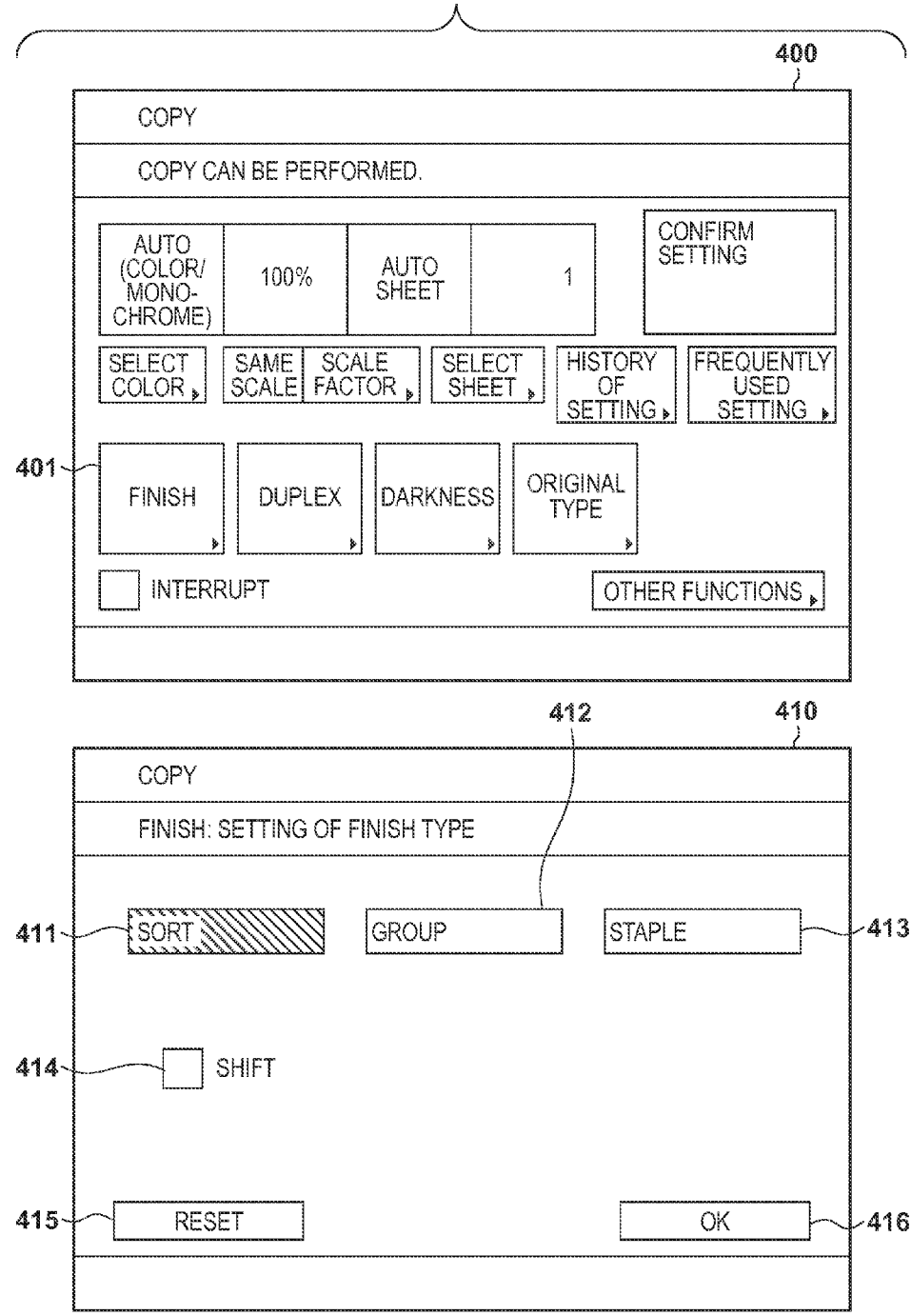
FIG. 11 shows examples of screens according to the first embodiment.

If the event detected in step S101 is pressing of the finish button, the processing proceeds to step S104. A screen 400 of FIG. 11 is a basic screen for copy displayed on the LCD 207. The user's pressing of an area corresponding to a finish button 401 displayed on the basic screen 400 is detected by the CPU 201, via the touchscreen 208 and the input/output interface 210, as a finish button pressing event. The details of step S104 will be described later with reference to FIG. 5.

If the event detected in step S101 is detection of the originals, the processing proceeds to step S105. The document feeder 103 is provided with the original detection sensor 214; when the user places the originals on the document feeder 103, the original detection sensor 214 detects the originals. The detection of the originals by the original detection sensor 214 is detected by the CPU 201, via the device interface 211, as an original detection event. The details of step S105 will be described later with reference to FIG. 6.

If the event detected in step S101 is pressing of the numeric keys 217, the processing proceeds to step S106. The numeric keys 217 are included among the hardware keys provided in the operation unit 108. The user's pressing of the numeric keys 217 is detected by the CPU 201, via the input/output interface 210, as a numeric key pressing event. In step S106, the CPU 201 sets the number of copies in accordance with the numeric keys detected in step S101. The set number of copies 219 is held in the RAM 204. A detailed description of the process of step S106 will be omitted.

If the event detected in step S101 is pressing of the start key 216, the processing proceeds to step S107. The start key 216 is included among the hardware keys provided in the operation unit 108. The user's pressing of the start key 216 is detected by the CPU 201, via the input/output interface 210, as a start key pressing event. The details of step S107 will be described later with reference to FIG. 7.

If the event detected in step S101 is reception of a print request, the processing proceeds to step S108. If the network interface 106 receives a print request from the PC and the like, the CPU 201 detects the reception as a print request event. The details of step S108 will be described later with reference to FIG. 8.

<Device Setting Processing>

Figure 4:
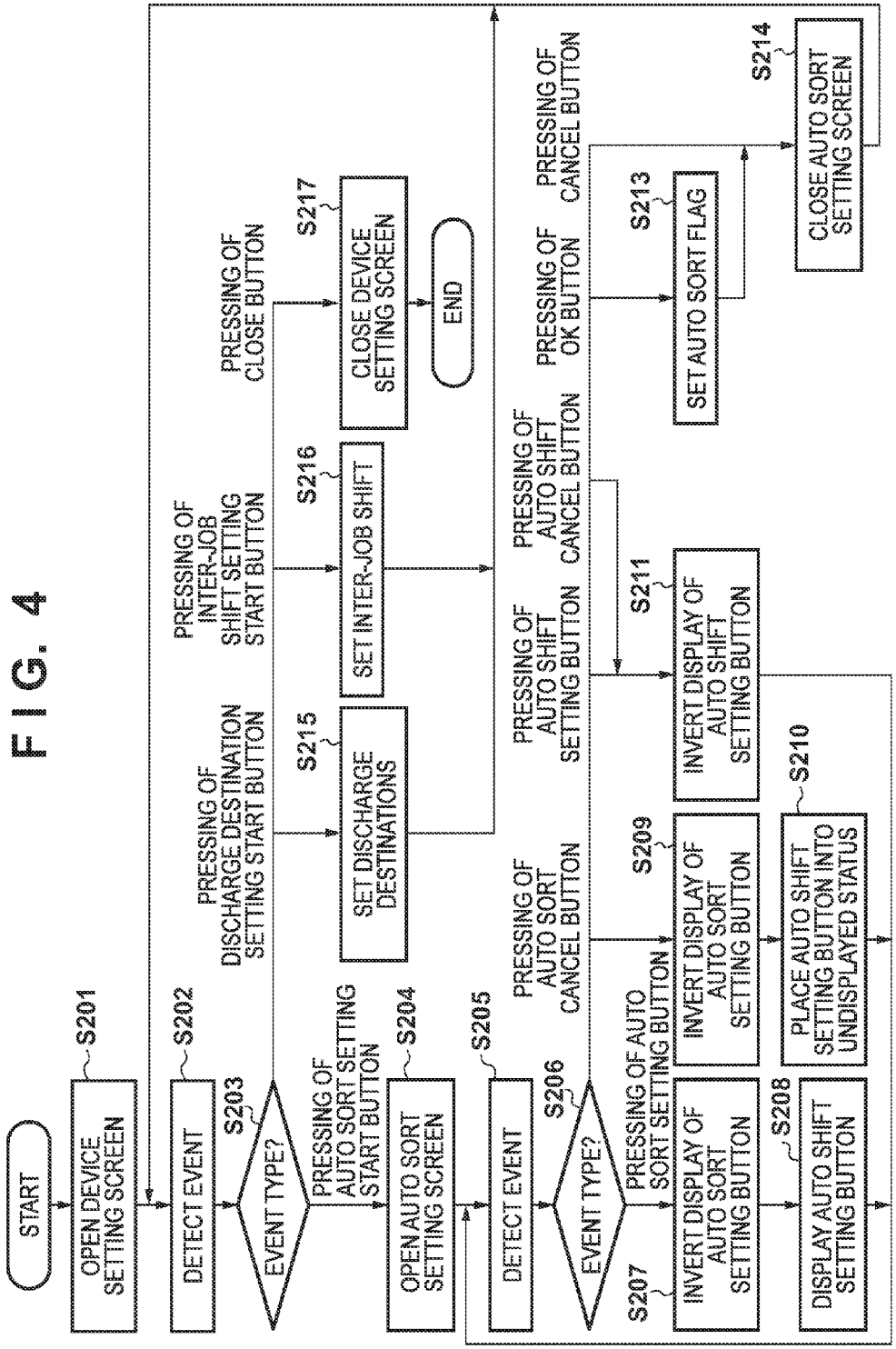
FIG. 4 is a flowchart showing the procedure of device setting processing in the image forming apparatus according to the first embodiment.
Figure 12:
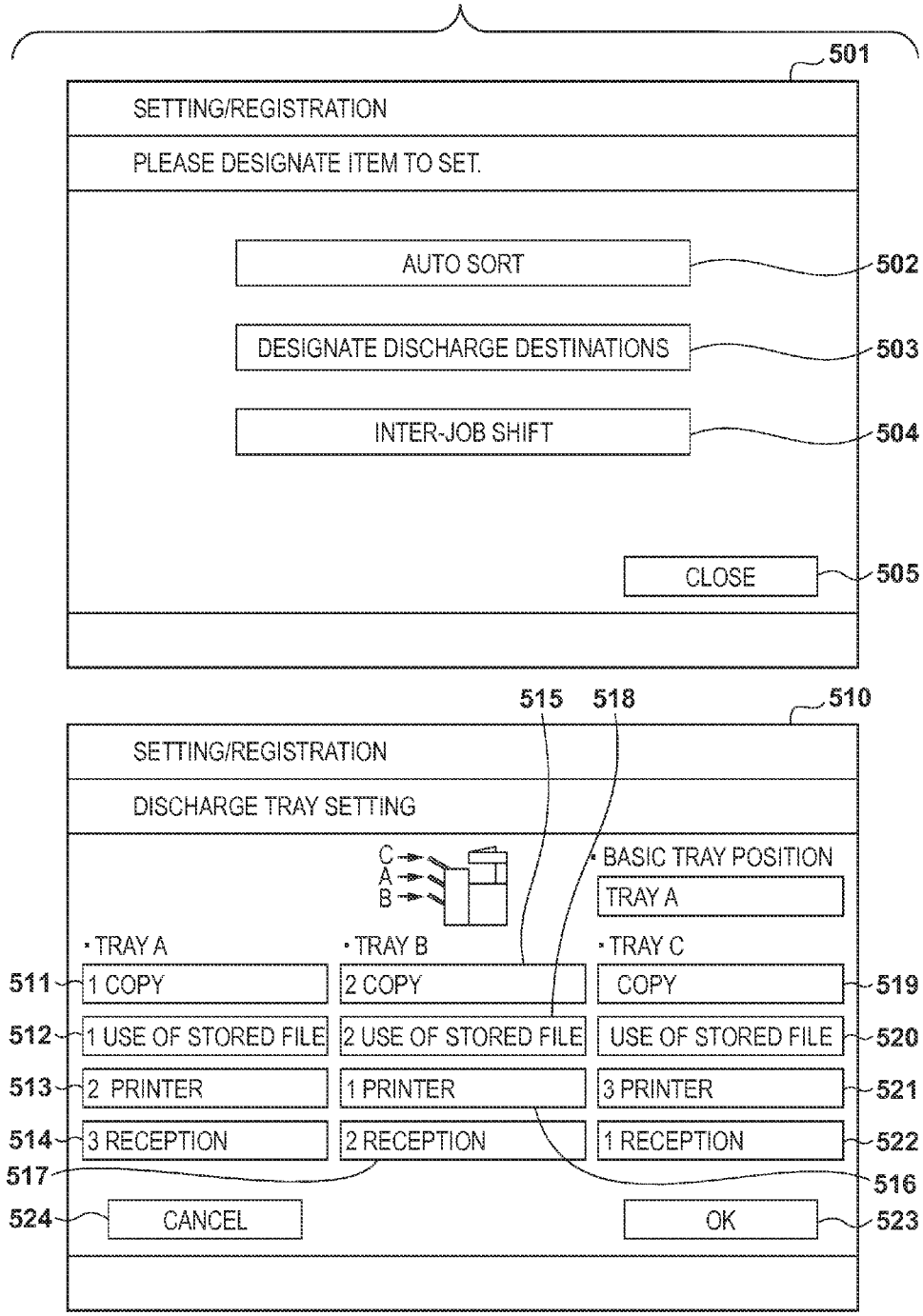
FIG. 12 shows examples of screens according to the first embodiment.

With reference to FIG. 4, a description is now given of the details of device setting processing of the above-mentioned step S103. First, in step S201, the CPU 201 displays a device setting screen on the LCD 207. Reference sign 501 of FIG. 12 represents an example of the device setting screen. An auto sort setting start button 502, a discharge destination setting start button 503, an inter-job shift setting start button 504, and a close button 505 are arranged on the device setting screen 501.

In step S202, the CPU 201 detects a change in the device status as an event. Subsequently, in step S203, the CPU 201 determines the type of the event detected in step S202. If the event detected in step S202 is pressing of the auto sort setting start button 502, the processing proceeds to step S204. If the event detected in step S202 is pressing of the discharge destination setting start button 503, the processing proceeds to step S215. If the event detected in step S202 is pressing of the inter-job shift setting start button 504, the processing proceeds to step S216. If the event detected in step S202 is pressing of the close button 505, the processing proceeds to step S217.

Figure 13:
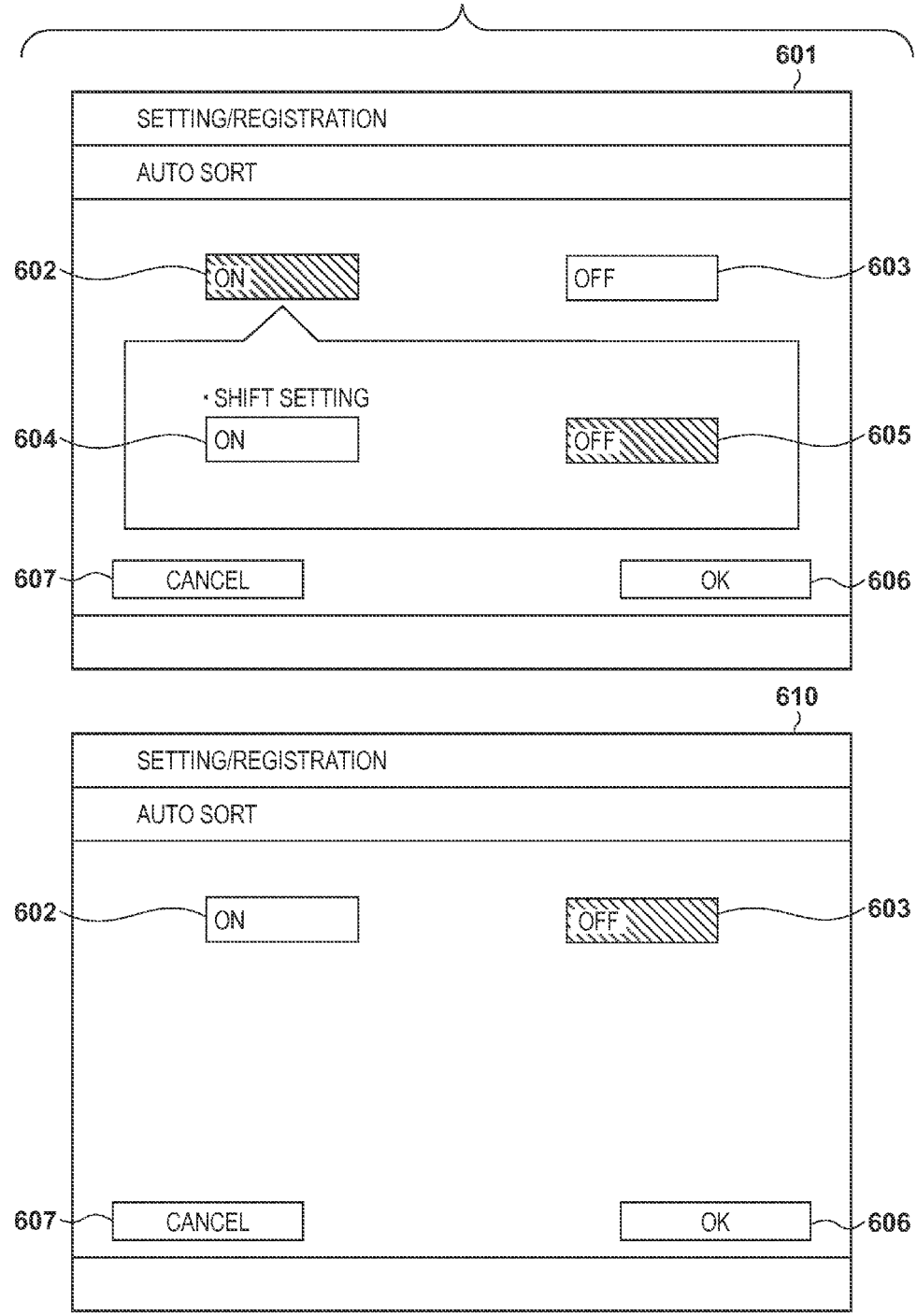
FIG. 13 shows examples of screens according to the first embodiment.

In step S204, the CPU 201 displays an auto sort setting screen on the LCD 207. It should be noted that, in the processes of step S204 onward, the CPU 201 functions as an auto setting unit. FIG. 13 shows an example of the auto sort setting screen. An auto sort setting button 602, an auto sort cancel button 603, an OK button 606, and a cancel button 607 are arranged on the auto sort setting screen 601. In addition, depending on the circumstances, an auto shift setting button 604 and an auto shift cancel button 605 are displayed. The initial display status of the auto sort setting screen 601 is determined by the content of the auto sort flag 301. The auto sort flag 301, which is held in the RAM 204, is auto setting information indicating whether auto sort and auto shift are valid or invalid.

Figure 10:
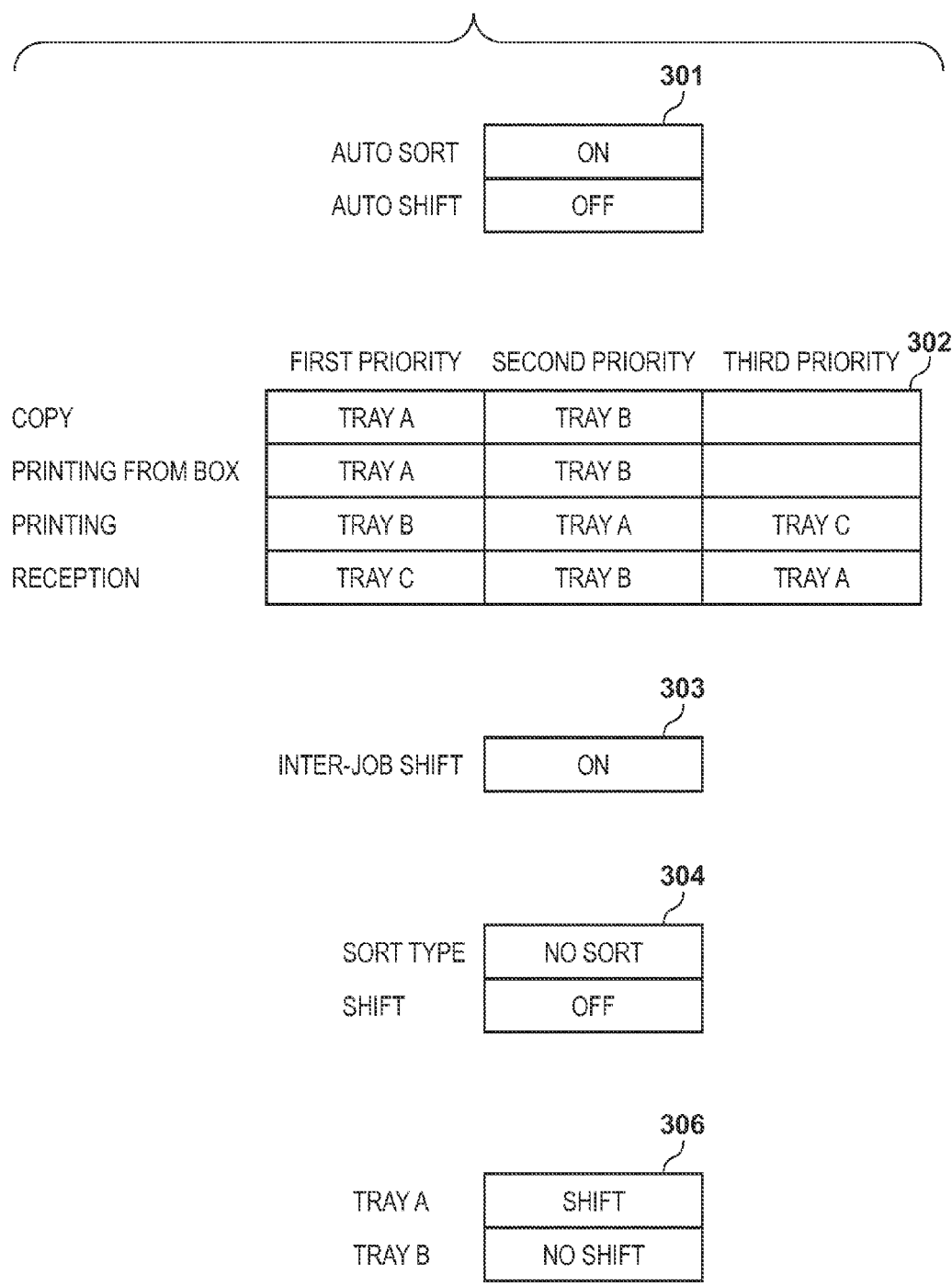
FIG. 10 shows examples of data held in a RAM according to the first embodiment.

As shown in FIG. 10, the auto sort flag 301 has a value "ON (valid)" or "OFF (invalid)" for each one of auto sort and auto shift. If it is "ON", a sort type or shift in the sort flag 304 is set to "ON" when the original detection sensor 214 has detected the originals, as will be described later with reference to FIG. 6.

For example, in the case where auto sort is "ON" and auto shift is "OFF", the auto sort setting screen 601 of FIG. 13 is displayed. In the case where auto sort is "OFF", an auto sort setting screen 610 of FIG. 13 is displayed. That is to say, in the case where auto sort is "ON", the auto sort setting button 602 is displayed in a pressed status (with shading in FIG. 13), and the auto sort cancel button 603 is displayed in a non-pressed status (no shading).

On the other hand, in the case where auto sort is "OFF", the auto sort setting button 602 is displayed in the non-pressed status, and the auto sort cancel button 603 is displayed in the pressed status. In addition, in the case where auto sort is "ON", the auto shift setting button 604 and the auto shift cancel button 605 are displayed, and in the case where auto sort is "OFF", the auto shift setting button 604 and the auto shift cancel button 605 are not displayed. Furthermore, in the case where auto shift is "ON", the auto shift setting button 604 is displayed in the pressed status, and the auto shift cancel button 605 is displayed in the non-pressed status. In the case where auto shift is "OFF", the auto shift setting button 604 is displayed in the non-pressed status, and the auto shift cancel button 605 is displayed in the pressed status.

In step S205, the CPU 201 detects a change in the device status as an event. In step S206, the CPU 201 determines the type of the event detected in step S205. If the event detected in step S205 is pressing of the auto sort setting button 602, the processing proceeds to step S207. If the event detected in step S205 is pressing of the auto sort cancel button 603, the processing proceeds to step S209. If the event detected in step S205 is pressing of the auto shift setting button 604 or pressing of the auto shift cancel button 605, the processing proceeds to step S211. If the event detected in step S205 is pressing of the OK button 606, the processing proceeds to step S213. If the event detected in step S205 is pressing of the cancel button 607, the processing proceeds to step S214.

In step S207, the CPU 201 changes the display of the auto sort setting button 602 into an inverted status, thereby placing the same into the pressed status, and places the display of the auto sort cancel button 603 into the non-pressed status. Subsequently, in step S208, the CPU 201 displays the auto shift setting button 604 and the auto shift cancel button 605, and returns to the process of step S205.

In step S209, the CPU 201 changes the display of the auto sort setting button 602 into an inverted status, thereby placing the same into the non-pressed status, and places the display of the auto sort cancel button 603 into the pressed status. Subsequently, in step S210, the CPU 201 places the auto shift setting button 604 and the auto shift cancel button 605 into an undisplayed status, and returns to the process of step S205.

In step S211, the CPU 201 changes the display of the auto shift setting button 604 and the auto shift cancel button 605 into an inverted status. Specifically, if the event detected in step S205 is pressing of the auto shift setting button 604, the display of the auto shift setting button 604 is placed into the pressed status, and the display of the auto shift cancel button 605 is placed into the non-pressed status. If the event detected in step S205 is pressing of the auto shift cancel button 605, the display of the auto shift setting button 604 is placed into the non-pressed status, and the display of the auto shift cancel button 605 is placed into the pressed status. When the process of step S211 ends, the processing returns to step S205.

In step S213, the CPU 201 reflects the display statuses of the auto sort setting button 602, the auto sort cancel button 603, the auto shift setting button 604, and the auto shift cancel button 605 into the auto sort flag 301. That is to say, if the auto sort setting button 602 is in the pressed status, the item of auto sort in the auto sort flag 301 is updated to "ON". If the auto sort cancel button 603 is in the pressed status, the item of auto sort in the auto sort flag 301 is updated to "OFF". If the auto shift setting button 604 is displayed in the pressed status, the item of auto shift in the auto sort flag 301 is updated to "ON". If the auto shift setting button 604 is not displayed or the auto shift cancel button 605 is in the pressed status, the item of auto shift in the auto sort flag 301 is updated to "OFF". When the process of step S213 ends, the processing proceeds to step S214. In step S214, the CPU 201 places the auto sort setting screen 601 into the undisplayed status (resulting in the status in which the device setting screen 501 is displayed), and returns to the process of step S202.

In step S215, the CPU 201 sets discharge destinations. First, a discharge destination setting screen 510 shown in FIG. 12 is displayed, and the jobs' respective discharge destinations are set in accordance with user settings. Information of the discharge destinations is held in the RAM 204 as the discharge destination information 302. The discharge destination setting screen 510 shows an example of the discharge destination information 302. The discharge destination information 302 stores, for each one of job types, information of trays used as a first priority, a second priority, and a third priority. A field that does not contain tray information indicates that there is no tray of the corresponding priority order. For example, in the case of the discharge destination information 302 shown in FIG. 10, a tray A and a tray B are respectively used as a first-priority discharge destination and a second-priority discharge destination in a copy job. The CPU 201 selects a tray with the highest priority order indicated by the discharge destination information 302 as a discharge destination. In a copy job, the tray C is not used as there is no information thereof. The CPU 201 can function as a priority order setting unit and set the discharge destination information 302 in accordance with user input.

Buttons 511 to 522 are arranged on the discharge destination setting screen 510 in correspondence with the job types and tray positions. For example, the button 511 corresponds to a copy job and the tray A. The buttons 511 to 522 have a toggle mechanism whereby each time they are pressed by the user, they alternate between the pressed status (in which the numbers are displayed) and the non-pressed status (in which the numbers are not displayed). In addition, for each one of the job types, the numbers displayed on the buttons change in the order in which the buttons are placed into the pressed status. For example, if the user presses the button 515 when the button 511 is in the pressed status and the buttons 515 and 519 are in the non-pressed status, the button 515 is placed into the pressed status and the number 2 is displayed thereon. A button in the pressed status indicates that a tray corresponding to that button is used in a job corresponding to that button. Furthermore, the number displayed on a button indicates the priority order of the corresponding tray. For example, in the case where the discharge destination setting screen 510 is in the status shown in FIG. 12, the button 515 indicates that the tray B is used as a second priority in a copy job.

If the user presses the OK button 523, the discharge destination information 302 is set in accordance with the display statuses of the buttons 511 to 522, and the discharge destination setting screen 510 is placed into the undisplayed status. The details of the processing flows corresponding to the user's pressing of the buttons will be omitted as they are similar to the case of the auto sort setting screen. When the discharge destination setting of step S215 ends, the processing proceeds to step S202.

Figure 14:
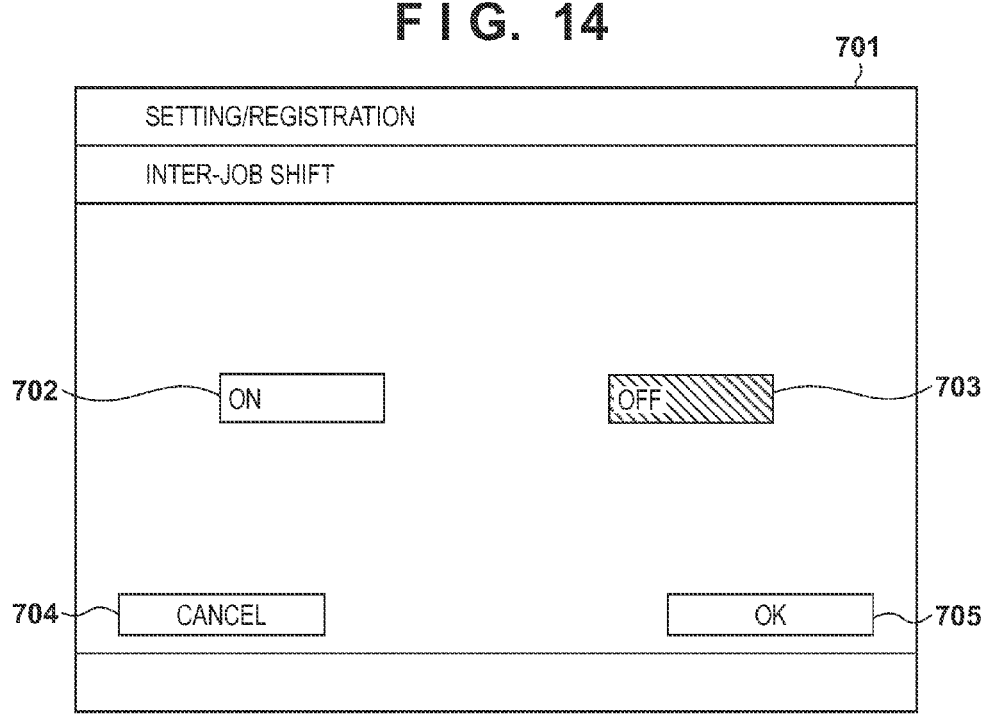
FIG. 14 shows an example of a screen according to the first embodiment.
Figure 15:
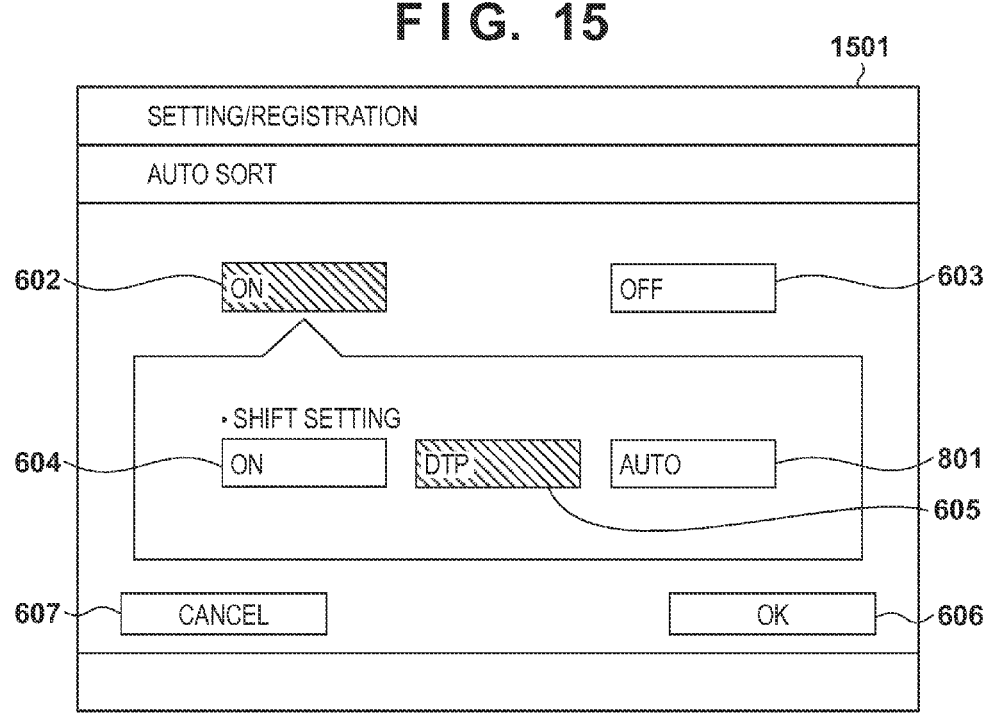
FIG. 15 shows an example of a screen according to the second embodiment.

In step S216, the CPU 201 sets inter-job shift. First, an inter-job shift setting screen 701 shown in FIG. 14 is displayed, and whether or not to perform inter-job shift is set in accordance with user settings. Information indicating whether or not to perform inter-job shift is held in the RAM 204 as the inter-job shift flag 303. FIG. 10 shows an example of the inter-job shift flag 303. The inter-job shift flag 303 has one of the following two statuses: "ON" and "OFF". In the case where the inter-job shift flag 303 is "ON", shift is performed at the time of discharge per unit of job. In the case where the inter-job shift flag 303 is "OFF", shift is not performed per unit of job.

An ON button 702 and an OFF button 703 are arranged on the inter-job shift setting screen 701. If the user presses the ON button 702, the ON button 702 is placed into the pressed status (shaded status), and the OFF button 703 is placed into the non-pressed status (unshaded status). If the user presses the OFF button 703, the ON button 702 is placed into the non-pressed status, and the OFF button 703 is placed into the pressed status. If the user presses an OK button 705, the inter-job shift flag 303 is set in accordance with the press statuses of the ON button 702 and the OFF button 703. If the ON button 702 is in the pressed status, the inter-job shift flag 303 is set to "ON", and if the OFF button 703 is in the pressed status, the inter-job shift flag 303 is set to "OFF". The details of the processing flows corresponding to the user's pressing of the buttons will be omitted as they are similar to the case of the auto sort setting screen. When the inter-job shift setting of step S216 ends, the processing proceeds to step S202.

In step S217, the CPU 201 places the device setting screen 501 into the undisplayed status (resulting in the status before the device setting screen 501 is displayed), and ends a subroutine for configuring the device setting (returns to the process of step S101).

<Finish Setting Processing>

Figure 5:
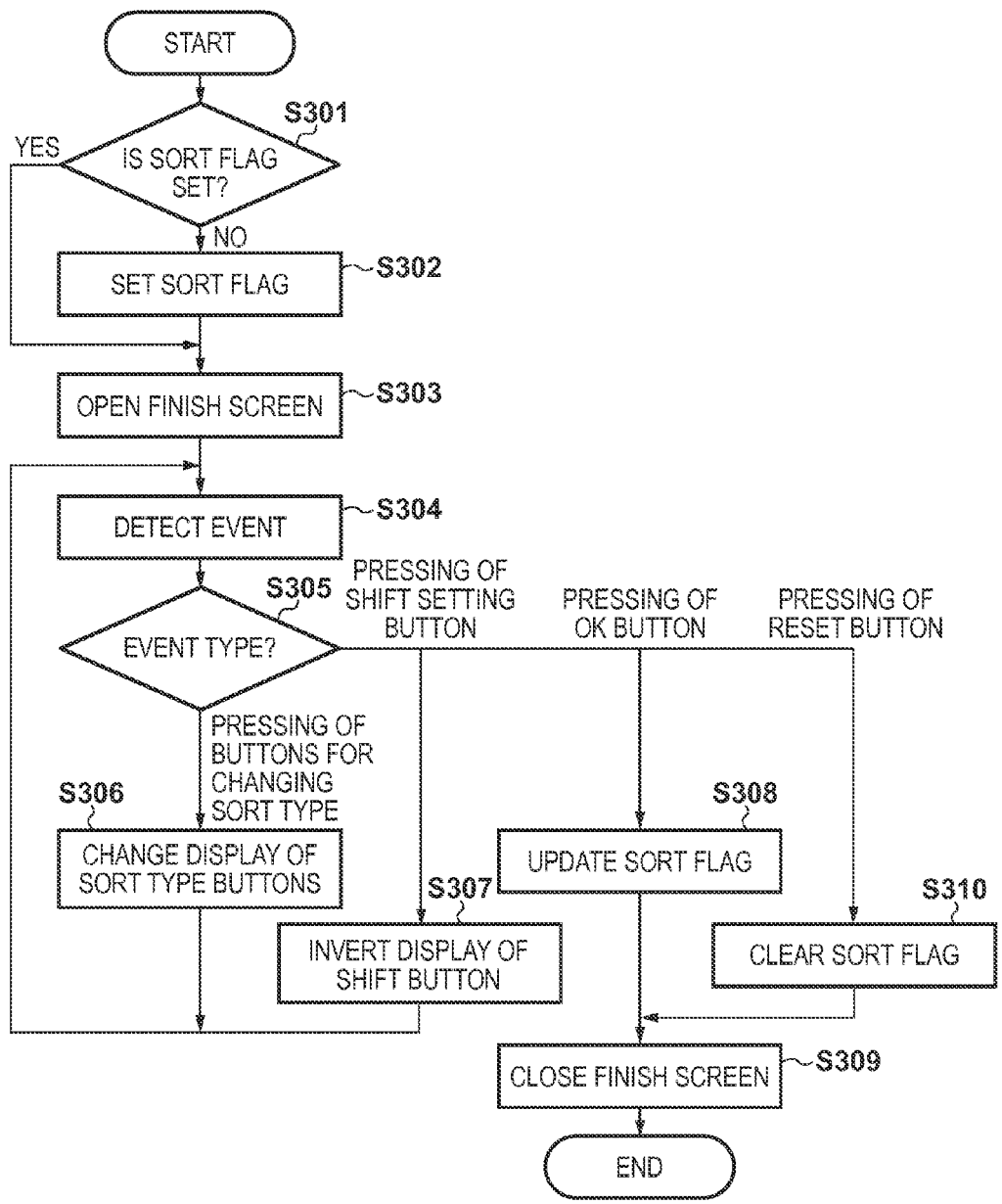
FIG. 5 is a flowchart showing the procedure of finish setting processing in the image forming apparatus according to the first embodiment.

With reference to FIG. 5, a description is now given of the details of finish setting processing of the above-mentioned step S104 for the case in which the finish button has been pressed. First, in step S301, the CPU 201 determines whether or not the sort flag is set. The sort flag 304 is information held in the RAM 204, and includes the following two items: a sort type and shift. The sort type has one of the following four types of values: "no sort", "sort", "group", and "staple". Shift has one of the following values: "ON" and "OFF". This shift indicates whether or not to shift discharged printouts, for example, every predetermined number of copies in a single job. In contrast, the inter-job shift flag 303 indicates whether or not to shift discharged printouts per unit of job when a plurality of jobs are performed. In step S301, the processing diverges based on the sort type; the processing proceeds to step S302 if the sort type is "no sort", and to step S303 otherwise (YES in the figure).

In step S302, the CPU 201 sets the sort type and shift in the sort flag 304 to "sort" and "ON", respectively, and proceeds to step S303. In step S303, the CPU 201 displays a finish screen on the LCD 207. Reference sign 410 of FIG. 11 represents an example of the finish screen. A sort setting button 411, a group setting button 412, a staple setting button 413, a shift setting button 414, a reset button 415, and an OK button 416 are arranged on the finish screen 410. The initial display statuses of the sort setting button 411, the group setting button 412, and the staple setting button 413 are determined by the sort type held in the sort flag 304 in the RAM 204. If the sort type is "sort", the sort setting button 411 is displayed in the pressed status (with shading in FIG. 11), and the group setting button 412 and the staple setting button 413 are displayed in the non-pressed status (no shading in FIG. 11). If the sort type is "group", the group setting button 412 is displayed in the pressed status, and the sort setting button 411 and the staple setting button 413 are displayed in the non-pressed status. If the sort type is "staple", the staple setting button 413 is displayed in the pressed status, and the sort setting button 411 and the group setting button 412 are displayed in the non-pressed status. The initial display status of the shift setting button 414 is determined by the content of shift held in the sort flag 304 in the RAM 204. If shift is "ON", the shift setting button 414 is displayed in the pressed status, and if the shift is "OFF", the shift setting button 414 is displayed in the non-pressed status.

Next, in step S304, the CPU 201 detects a change in the device status as an event. Subsequently, in step S305, the CPU 201 determines the type of the event detected in step S304. In the case where the event detected in step S304 is pressing of one of the sort setting button 411, the group setting button 412, and the staple setting button 413, the processing proceeds to step S306. If the event detected in step S304 is pressing of the shift setting button 414, the processing proceeds to step S307. If the event detected in step S304 is pressing of the OK button 416, the processing proceeds to step S308. If the event detected in step S304 is pressing of the reset button 415, the processing proceeds to step S310.

In step S306, the CPU 201 changes the display statuses of the sort setting button 411, the group setting button 412, and the staple setting button 413 in accordance with the pressed button that has been detected. In the case where pressing of the sort setting button 411 has been detected, the sort setting button 411 is displayed in the pressed status, and the group setting button 412 and the staple setting button 413 are displayed in the non-pressed status. In the case where pressing of the group setting button 412 has been detected, the group setting button 412 is displayed in the pressed status, and the sort setting button 411 and the staple setting button 413 are displayed in the non-pressed status. In the case where pressing of the staple setting button 413 has been detected, the staple setting button 413 is displayed in the pressed status, and the sort setting button 411 and the group setting button 412 are displayed in the non-pressed status. When the process for changing the display of the sort type buttons in step S306 ends, the processing returns to step S304.

In step S307, the CPU 201 inverts the display status of the shift setting button 414. If the shift setting button 414 is in the pressed status, the display status of the shift setting button 414 is switched to the non-pressed status, and if the shift setting button 414 is in the non-pressed status, the display status of the shift setting button 414 is switched to the pressed status. When the process for inverting the display of the shift button in step S307 ends, the processing returns to step S304.

In step S308, the CPU 201 changes the content of the sort flag 304 in accordance with the display status of the finish screen 410. If the sort setting button 411 is in the pressed status, the sort type in the sort flag 304 is set to "sort". If the group setting button 412 is in the pressed status, the sort type in the sort flag 304 is set to "group". If the staple setting button 413 is in the pressed status, the sort type in the sort flag 304 is set to "staple". If the shift setting button is in the pressed status, shift in the sort flag 304 is set to "ON", and if the shift setting button is in the non-pressed status, shift in the sort flag 304 is set to "OFF". Subsequently, in step S309, the CPU 201 places the finish screen 410 into the undisplayed status (resulting in the status in which the copy basic screen 401 is displayed), and ends a subroutine for executing the processing for the case in which the finish button has been pressed (returns to the process of step S101).

In step S310, the CPU 201 sets the sort type in the sort flag 304 to "no sort", and sets shift in the sort flag 304 to "OFF". When the process for clearing the sort flag in step S310 ends, the processing proceeds to step S309.

<Auto Setting Processing>

Figure 6:
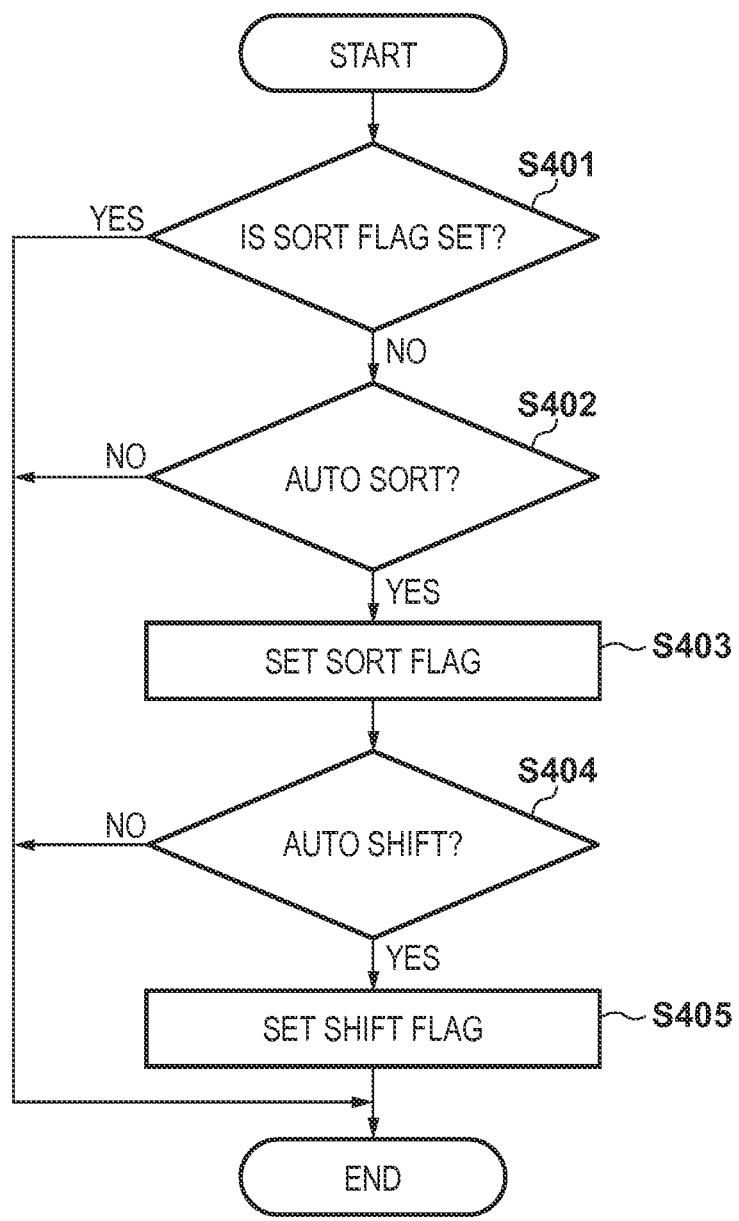
FIG. 6 is a flowchart showing the procedure of auto setting processing in the image forming apparatus according to the first embodiment.

With reference to FIG. 6, a description is now given of the procedure of processing of the above-mentioned step S105 for the case in which the originals have been detected. It should be noted that, in the processing described below, the CPU 201 functions as a discharge function setting unit. When the user places the originals on the document feeder 103, the CPU 201 refers to the sort type in the sort flag 304 in step S401, and the processing diverges based on the sort type. In the case where the sort type in the sort flag 304 is "no sort", the processing proceeds to step S402 (NO in the figure); otherwise, the present subroutine ends (YES in the figure).

In step S402, the CPU 201 refers to the item of auto sort in the auto sort flag 301, and if the item of auto sort in the auto sort flag 301 is "ON", proceeds to the process of step S403 (YES in the figure); otherwise, the present subroutine ends (NO in the figure). In step S403, the CPU 201 sets the sort type in the sort flag 304 to "sort".

Next, in step S404, the CPU 201 refers to the item of auto shift in the auto sort flag 301, and if the item of auto shift in the auto sort flag 301 is "ON", proceeds to the process of step S405 (YES in the figure); otherwise, the present subroutine ends (NO in the figure). In step S405, the CPU 201 sets the item of shift in the sort flag 304 to "ON", and ends the subroutine for executing the processing for the case in which the originals have been detected (returns to the process of step S101).

<Start Processing>

Figure 7:
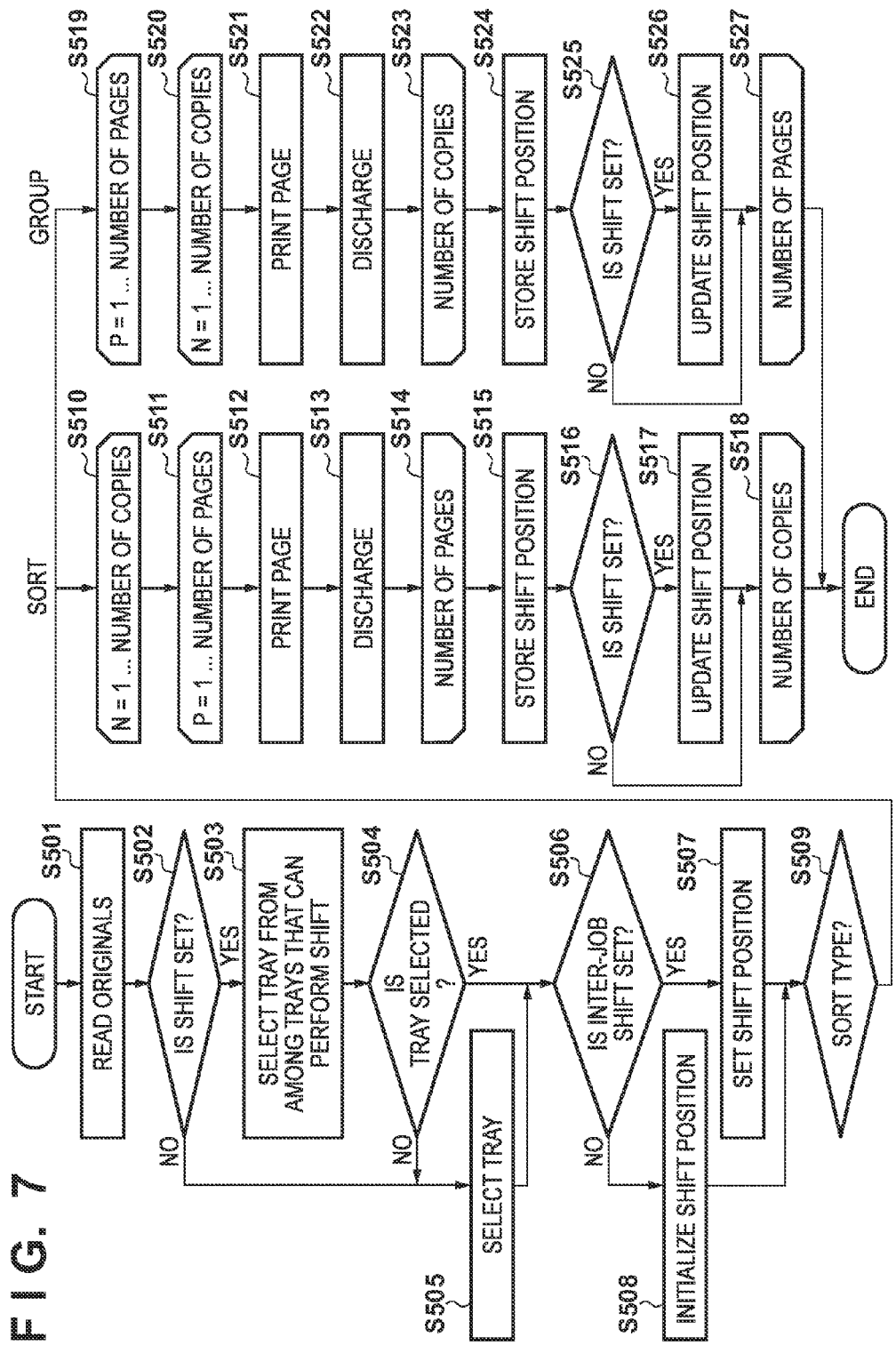
FIG. 7 is a flowchart showing the procedure of start processing in the image forming apparatus according to the first embodiment.

With reference to FIG. 7, a description is now given of the procedure of processing of the above-mentioned step S107 for the case in which the start key 216 has been pressed. First, in step S501, the CPU 201 causes the scanner 102 to read an image from an original, and outputs image data. Specifically, it sends the original to the scanner 102 by controlling the document feeder 103, and causes the scanner 102 to read the original. The read image is held in the HDD 206 as image data 218. In addition, each time one page of an original is read, the number of pages 220 held in the RAM 204 is incremented. All of the originals are read by repeating the above until the original detection sensor 214 of the document feeder 103 no longer detects any original.

Next, in step S502, the CPU 201 refers to the item of shift (first discharge function) in the sort flag 304, and in the case where shift in sort flag 304 is "ON", proceeds to the process of step S503 (YES in the figure); otherwise, the processing proceeds to step S505.

In step S503, the CPU 201 refers to the discharge destination information 302 and function information 306 shown in FIG. 10, and selects a tray (discharge tray) from among trays that can perform shift. Here, the function information 306 indicates, with respect to each one of the plurality of discharge destinations, whether or not the discharge function is executable, and is stored in advance in the RAM 204. In the example of FIG. 10, the function information 306 indicates that the tray A has the shift function whereas the tray B does not have the shift function. Specifically, if the first-priority tray in the discharge destination information 302 corresponding to a copy job can perform shift, the CPU 201 selects the first-priority tray as a discharge destination. If the first-priority tray cannot perform shift, a second-priority tray is selected as the discharge destination. If neither of the first-priority tray and the second-priority tray can perform shift, a third-priority tray is selected as the discharge destination. The selected tray is held in the RAM 204 as a discharge destination 221. It should be noted that, in the present step, information of the setting that is not related to shift may also be included as information of tray selection. For example, in the case where both of the first-priority tray and the second-priority tray can perform shift, if the configured setting can be realized only by the second-priority tray, the second-priority tray is selected as the discharge destination. In addition, it is assumed that no value is set in the discharge destination 221 in the case where shift cannot be performed by any of the discharge destinations that are set in the discharge destination information 302 in correspondence with a copy job.

Next, in step S504, the CPU 201 determines whether or not a value is set in the discharge destination 221; it proceeds to the process of step S506 in the case where a value is set in the discharge destination 221 (YES in the figure), and proceeds to the process of step S505 in the case where no value is set in the discharge destination 221 (NO in the figure). In step S505, the CPU 201 refers to the discharge destination information 302 and selects a tray. Specifically, the first-priority tray in the discharge destination information 302 corresponding to a copy job is selected as the discharge destination. The selected tray is held in the RAM 204 as the discharge destination 221. It should be noted that, in the present step, information of the setting that is not related to shift may also be included as information of tray selection. For example, in the case where the configured setting can be realized only by the second-priority tray, the second-priority tray is selected as the discharge destination. It should be noted that, in the present step, one of the trays set as the first, second, and third priorities is always held in the RAM 204 as the discharge destination 221. When the tray selection of step S505 ends, the processing proceeds to step S506.

In step S506, the CPU 201 refers to the inter-job shift flag 303, and if the inter-job shift flag 303 is "ON", proceeds to the process of step S507 (YES in the figure); otherwise, the processing proceeds to step S508 (NO in the figure). It should be noted that the inter-job shift function corresponds to a second discharge function. In step S507, the CPU 201 refers to the previous shift position 305 and sets a shift position. The previous shift position 305 is held in the RAM 204 as 222. The previous shift position 305 is information that indicates, for each one of the discharge trays, whether or not shift was performed at the time of the immediately preceding discharge, and is held in the RAM 204. FIG. 10 shows an example of the previous shift position 305. The example of FIG. 10 indicates that the tray A performed shift at the time of the immediately preceding discharge, and that the tray B did not perform shift at the time of the immediately preceding discharge. In step S507, the item in the previous shift position 305 corresponding to the discharge destination 221 is referred to, and if shift was performed at the time of the immediately preceding discharge, the shift position 222 is set to "no shift". On the other hand, if shift was not performed at the time of the immediately preceding discharge, the shift position 222 is set to "shift". It should be noted that, in the case where a tray that cannot perform shift is set as the discharge destination 221, nothing is performed in the present step. When the shift position setting of step S507 ends, the processing proceeds to step S509. On the other hand, in step S508, the CPU 201 sets the shift position 222 to "no shift". When the shift position initialization of step S508 ends, the processing proceeds to step S509. In step S509, the CPU 201 refers to the sort type in the sort flag 304, and in the case where the sort type is "sort" or "staple", proceeds to the process of step S510; otherwise, the processing proceeds to step S519. It should be noted that the sort function corresponds to a third discharge function.

Step S510 to step S518 form a loop, and the processes of step S511 onward are repeated for the number of times corresponding to the value set as the number of copies 219. It is assumed that a loop counter of N is used here. N takes any value in a range of one to the value set as the number of copies 219. Step S511 to step S514 also form a loop, and the processes of step S512 onward are repeated for the number of times corresponding to the value set as the number of pages 220. It is assumed that a loop counter of P is used here. P takes any value in a range of one to the value set as the number of pages 220.

In step S512, the CPU 201 transmits data of the $P^{th}$ page in the image data 218 to the printer 104, and causes the printer 104 to print an image of the $P^{th}$ page on a sheet.

Subsequently, in step S513, the CPU 201 sends the sheet printed in step S512 to the finisher 105, and discharges the sheet to a discharge tray set as the discharge destination 221. At this time, the shift position 222 is referred to, and in the case where the shift position 222 is set to "shift", discharge is performed while shifting the discharge position. It should be noted that, in the case where the discharge tray set as the discharge destination 221 cannot perform shift, control for shifting the discharge position is not performed. In step S514, the CPU 201 makes a determination about the condition of termination of the loop, that is to say, if the loop counter P has reached the value set as the number of pages 220, the processing proceeds to step S515; otherwise, the loop counter is incremented by one, and the processing proceeds to step S511.

In step S515, the CPU 201 holds the content of the shift position 222 in the RAM 204 as the previous shift position 305. The item in the previous shift position 305 corresponding to the discharge tray set as the discharge destination 221 is updated. It should be noted that, in the case where the discharge tray set as the discharge destination 221 cannot perform shift, nothing is performed in the present step. Subsequently, in step S516, the CPU 201 refers to the item of shift in the sort flag 304, and if shift is "ON", proceeds to the process of step S517 (YES in the figure); otherwise, the processing proceeds to step S518 (NO in the figure). In step S517, the CPU 201 updates the content of the shift position 222. In the case where the content of the shift position 222 is set to "shift", the content of the shift position 222 is switched to "no shift". In the case where the content of the shift position 222 is set to "no shift", the content of the shift position 222 is switched to "shift". When the process of step S517 ends, the processing proceeds to step S518.

In step S518, the CPU 201 makes a determination about the condition of termination of the loop, that is to say, if the loop counter N has reached the value set as the number of copies 219, the present subroutine ends; otherwise, the loop counter is incremented by one, and the processing proceeds to step S510. When the present subroutine ends, the processing returns to step S101.

A description of the processes from step S519 to step S526 will be omitted as they are similar to the processes from step S510 to step S518, except that the number of copies and the number of pages are reversed in order in the loop.

<Processing for Receiving Print Request>

Figure 8:
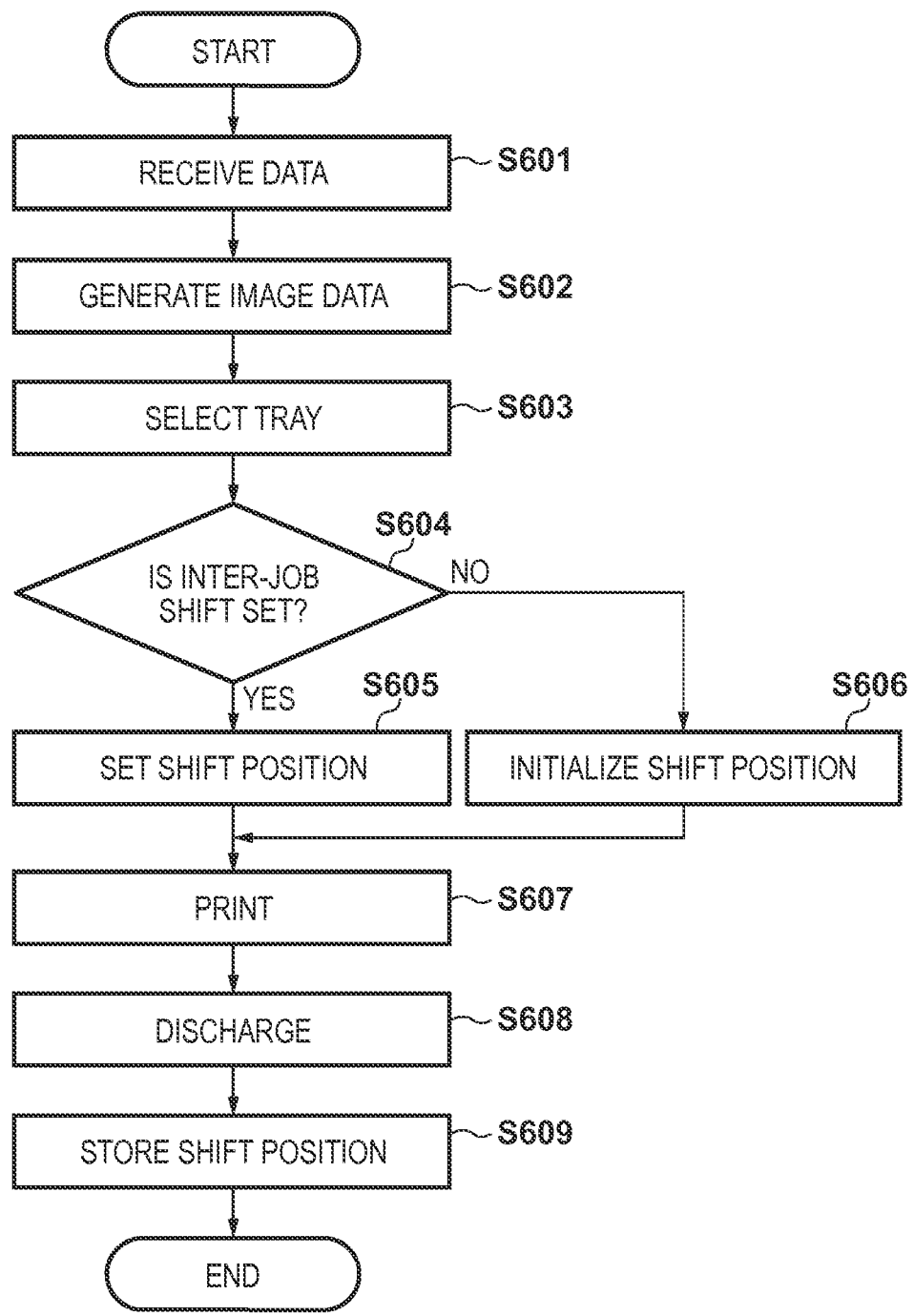
FIG. 8 is a flowchart showing the procedure of reception processing in the image forming apparatus according to the first embodiment.

With reference to FIG. 8, a description is now given of the processing of the above-mentioned step S108 for the case in which a print request has been received from the PC and the like. First, in step S601, the CPU 201 receives data to be printed from, for example, the personal computer 107 via the network interface 106. The data to be printed may be described in a page description language (PDL), and may be a bitmap data of some sort of format.

Next, in step S602, the CPU 201 generates image data to be printed from the data received in step S601. The CPU 201 also holds the generated image data in the HDD 206 as image data 218. In step S603, the CPU 201 refers to the discharge destination information 302 and selects a discharge tray. The CPU 201 selects a discharge tray in accordance with the priority orders that are set in the discharge destination information 302 in correspondence with a print job. At this time, the print request received in the above-mentioned step S101 and the data received in the above-mentioned S601 may be used as information for selecting a discharge tray. The CPU 201 holds the selected discharge tray in the RAM 204 as a discharge destination 221.

Next, in step S604, the CPU 201 refers to the inter-job shift flag 303, and if the inter-job shift flag 303 is "ON", proceeds to the process of step S605 (YES in the figure); otherwise, the processing proceeds to step S606 (NO in the figure). In step S605, the CPU 201 refers to the previous shift position 305 and sets a shift position. The CPU 201 holds this shift position in the RAM 204 as a shift position 222. In step S605, the item in the previous shift position 305 corresponding to the discharge destination 221 is referred to, and if shift was performed at the time of the immediately preceding discharge, the shift position 222 is set to "no shift". On the other hand, if shift was not performed at the time of the immediately preceding discharge, the shift position 222 is set to "shift". It should be noted that, in the case where a tray that cannot perform shift is set as the discharge destination 221, nothing is performed in the present step. When the process of step S605 ends, the processing proceeds to step S607. On the other hand, in step S606, the CPU 201 sets the shift position 222 to "no shift", and proceeds to the process of step S607.

In step S607, the CPU 201 transmits data in the image data 218 to the printer 104, and causes the image to be printed on a sheet. Subsequently, in step S608, the CPU 201 sends the sheet printed in step S607 to the finisher 105, and discharges the sheet to the discharge tray set as the discharge destination 221. At this time, the shift position 222 in the RAM 204 is referred to, and in the case where the shift position 222 is set to "shift", discharge is performed while shifting the discharge position. It should be noted that, in the case where the discharge tray set as the discharge destination 221 cannot perform shift, control for shifting the discharge position is not performed.

Next, in step S609, the CPU 201 holds the content of the shift position 222 in the RAM 204 as the previous shift position 305. The item in the previous shift position 305 corresponding to the discharge tray set as the discharge destination 221 is updated. It should be noted that, in the case where the discharge tray set as the discharge destination 221 cannot perform shift, nothing is performed in the present step. When the process of step S609 ends, the present subroutine ends, and the processing returns to step S101.

As described above, according to the present embodiment, in the case where shift has been designated by pressing the shift setting button 414 on the finish screen 410, a discharge destination is selected from among the trays that can perform shift in the above-mentioned step S503, and therefore shift can be performed reliably. In addition, in the present embodiment, depending on the press status of the auto shift setting button 604, shift may be set or may not be set when the original detection sensor 214 has detected the originals. In the case where the auto shift setting button is set to "ON", shift is set concurrently with auto sort, and therefore the user can experience the convenience of the shift function without being conscious about the shift function. On the other hand, by setting the auto shift setting button to "OFF", a discharge destination can be selected in strict compliance with the priority orders of the discharge destinations. Furthermore, in the case where neither auto shift nor the shift setting on the finish screen 410 is configured and only inter-job shift is set, a discharge destination is selected from among all of the trays in the above-mentioned step S505. In this way, a discharge destination can be selected in line with the setting of discharge destination priorities for each one of the job types.

It should be noted that there are cases in which a print request for multiple copies is received in network printing of step S108. In a print request for multiple copies, the number of copies may be equal to the number of jobs, or multiple copies may be grouped into a single job. In the case of a print request in which multiple copies are grouped into a single job, the print request may indicate copy-by-copy shift. In this case, shift control may be similar to or different from shift control in a copy job. That is to say, after a discharge destination has been selected in accordance with the discharge destination information 302, shift may be performed if the discharge destination can perform shift (priority on the discharge destination). Alternatively, a discharge destination that can perform shift may be selected in accordance with the discharge destination information 302 (priority on the function). Furthermore, a flag similar to the auto sort flag 301 may be provided for network printing so as to perform shift control similar to shift control in a copy job.

Second Embodiment

The following describes a second embodiment of the present invention. In the present embodiment, as shown on an auto sort setting screen 1501 of FIG. 15, an auto shift auto button 801 is provided on the auto sort setting screen 601 of FIG. 13 according to the above-described first embodiment. In this case, auto shift in the auto sort flag 301 takes the following three values: "ON", "OFF", and "auto". Here, "ON" indicates that the auto setting is configured, "OFF" indicates that the auto setting is not configured, and "auto" indicates that the auto setting is configured optionally. Similarly to the auto shift setting button 604 and the auto shift cancel button 605, pressing of the auto shift auto button 801 is detected and processed respectively in step S206 and step S211 within step S103, which is the subroutine for configuring the device setting. In the case where pressing of the auto shift auto button 801 has been detected, in step S211, the auto shift setting button 604 and the auto shift cancel button 605 are placed into the non-pressed status, and the auto shift auto button 801 is placed into the pressed status. Furthermore, in step S213, in the case where the auto shift auto button 801 is in the pressed status, the item of auto shift in the auto sort flag 301 is set to "auto".

<Auto Setting Processing>

Figure 9:
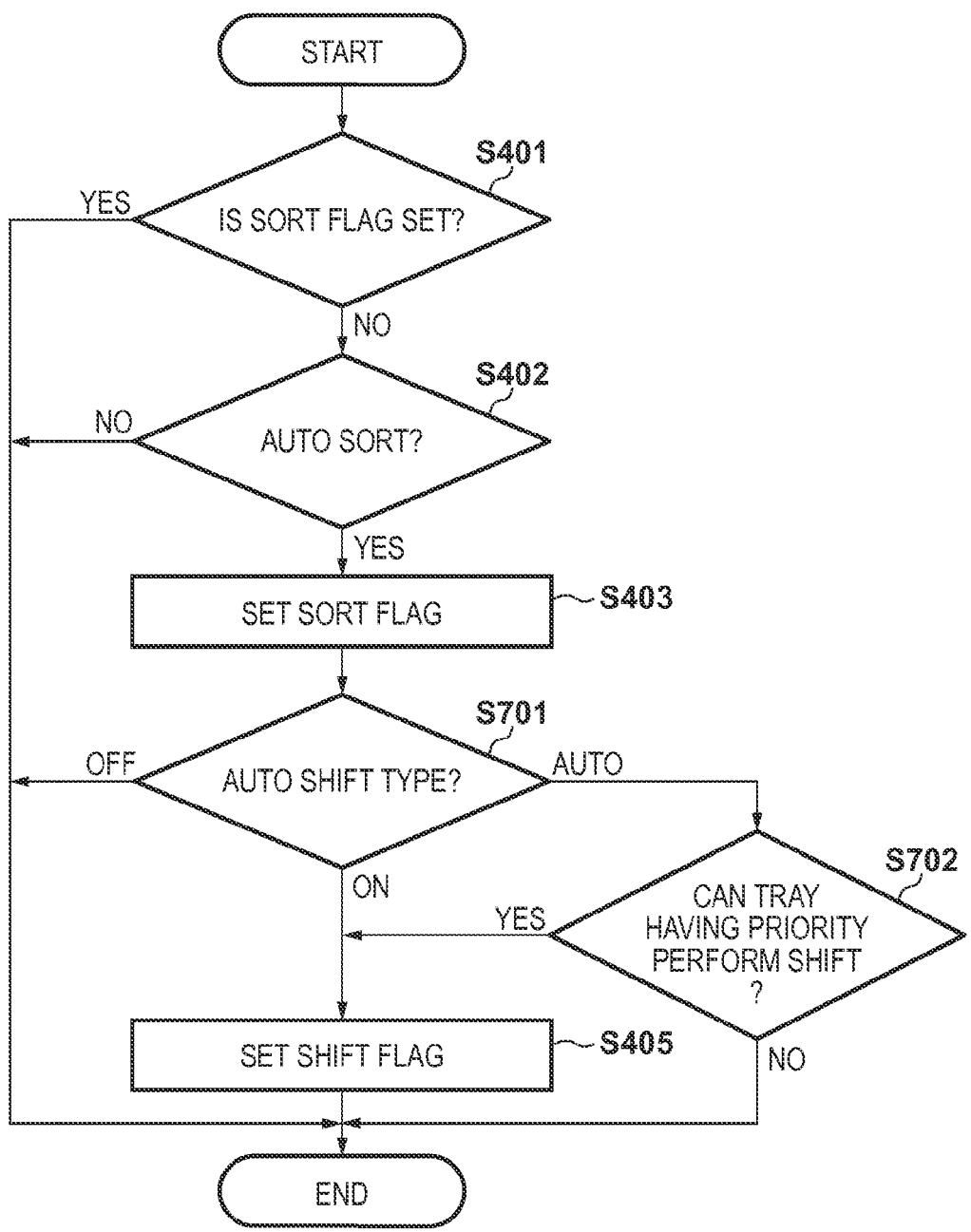
FIG. 9 is a flowchart showing the procedure of auto setting processing in an image forming apparatus according to a second embodiment.

The substance of the processing of step S107, which is the subroutine for executing the processing for the case in which the originals have been detected, is shown in FIG. 9. The processing of FIG. 9 is basically similar to the processing of FIG. 6. Therefore, the differences between FIG. 6 and FIG. 9 will be described below. In the processing flow shown in FIG. 9, the process of step S701 is executed in place of the process of step S404. In step S701, the CPU 201 refers to the item of auto shift in the auto sort flag 301, and if the item of auto shift in the auto sort flag 301 is "ON", proceeds to the process of step S405 (ON in the figure). If the item of auto shift in the auto sort flag 301 is "OFF", the present subroutine ends (OFF in the figure). If the item of auto shift in the auto sort flag 301 is "auto", the processing proceeds to step S702 (AUTO in the figure).

In step S702, the CPU 201 refers to the discharge destination information 302, and determines whether or not the first-priority tray corresponding to a copy job can perform shift. If the first-priority tray corresponding to a copy job can perform shift, the processing proceeds to step S405 (YES in the figure); otherwise, the present subroutine ends (NO in the figure). Other processes are similar to the processing flow of FIG. 6.

As described above, according to the present embodiment, by placing the auto shift auto button 801 into the pressed status, it is possible to control whether or not to perform auto shift on a discharge destination having priority. In the case where the discharge destination having priority is a tray that can perform shift, auto shift is performed. Furthermore, in the case where a tray that cannot perform shift is desired to be used as the discharge destination having priority, it is sufficient only to change the discharge destination setting, and there is no need to change the auto shift setting.

Third Embodiment

Figure 3:
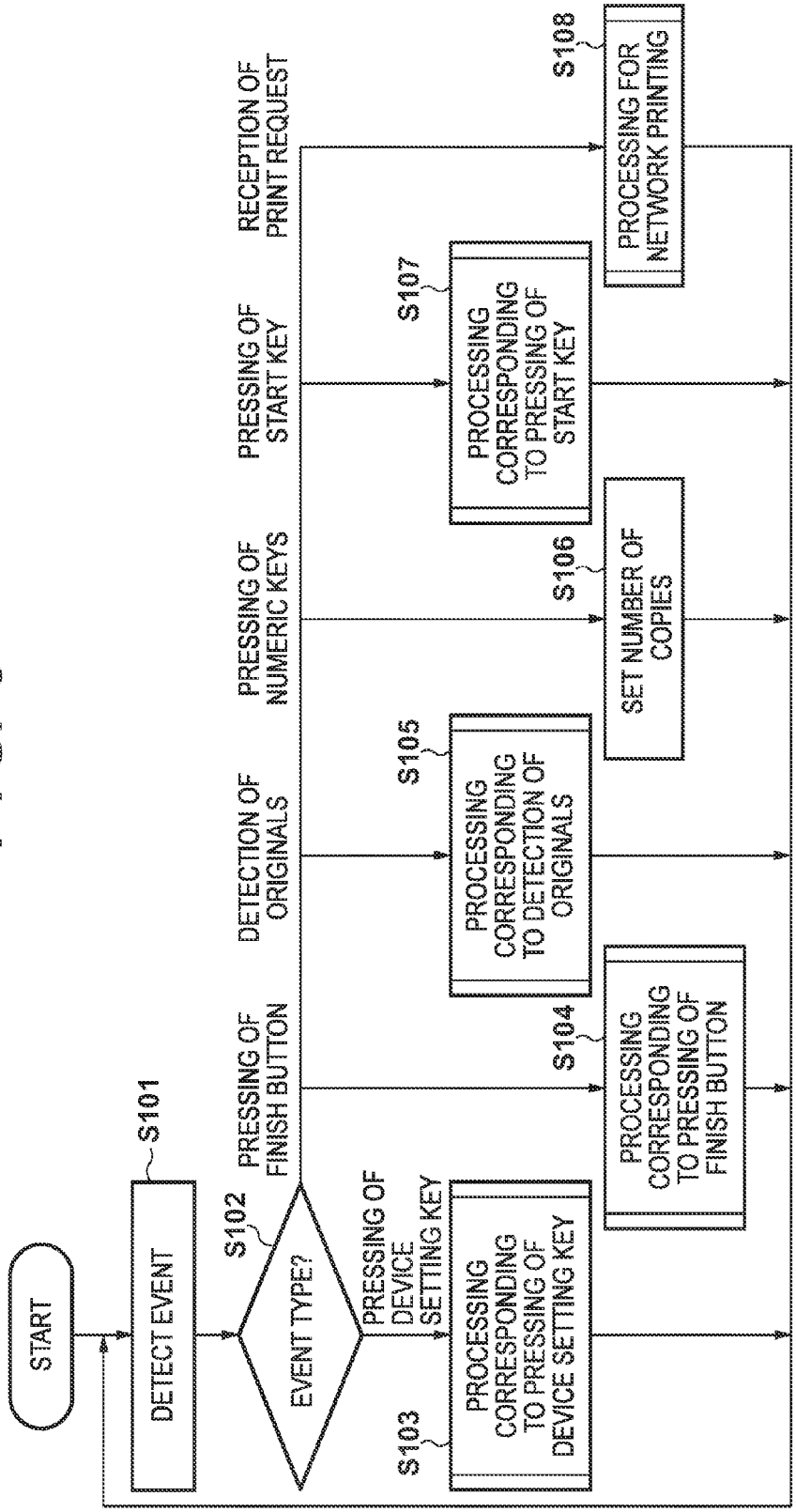
FIG. 3 is a flowchart showing the procedure of event detection processing in the image forming apparatus according to the first embodiment.

The following describes a third embodiment of the present invention pertaining to the case in which the user designates a discharge destination. In the above-described first and second embodiments, the user merely designates the priority orders of discharge destinations, and does not directly designate a discharge destination. In contrast, the present embodiment described below involves control for the case in which the user has specified a discharge destination. In the present embodiment, in the case where the user has directly selected a discharge destination, a sheet is discharged to the discharge destination set by the user regardless of the setting of the discharge function and the priority orders. Similarly to the above-described embodiments, processing complying with the flowchart shown in FIG. 3 is executed in the present embodiment as well. The present embodiment differs from the above-described embodiments in that the substance of the processing of the subroutine that is called up when the finish button is pressed (step S104) complies with a flowchart of FIG. 16 instead of the flowchart of FIG. 5.

<Finish Setting Processing>

Figure 16:
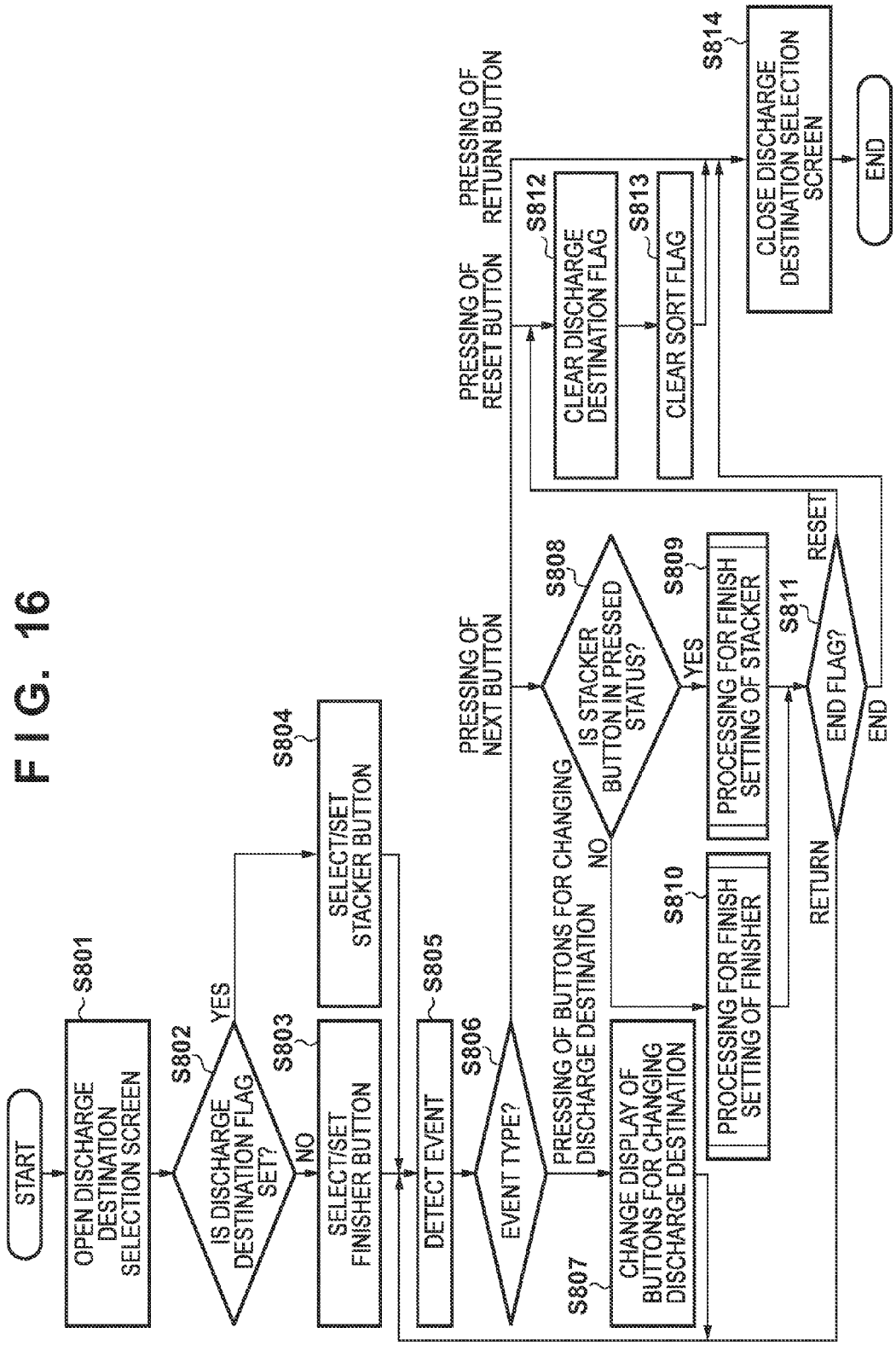
FIG. 16 is a flowchart showing the procedure of discharge destination selection processing in an image forming apparatus according to a third embodiment.
Figure 20:
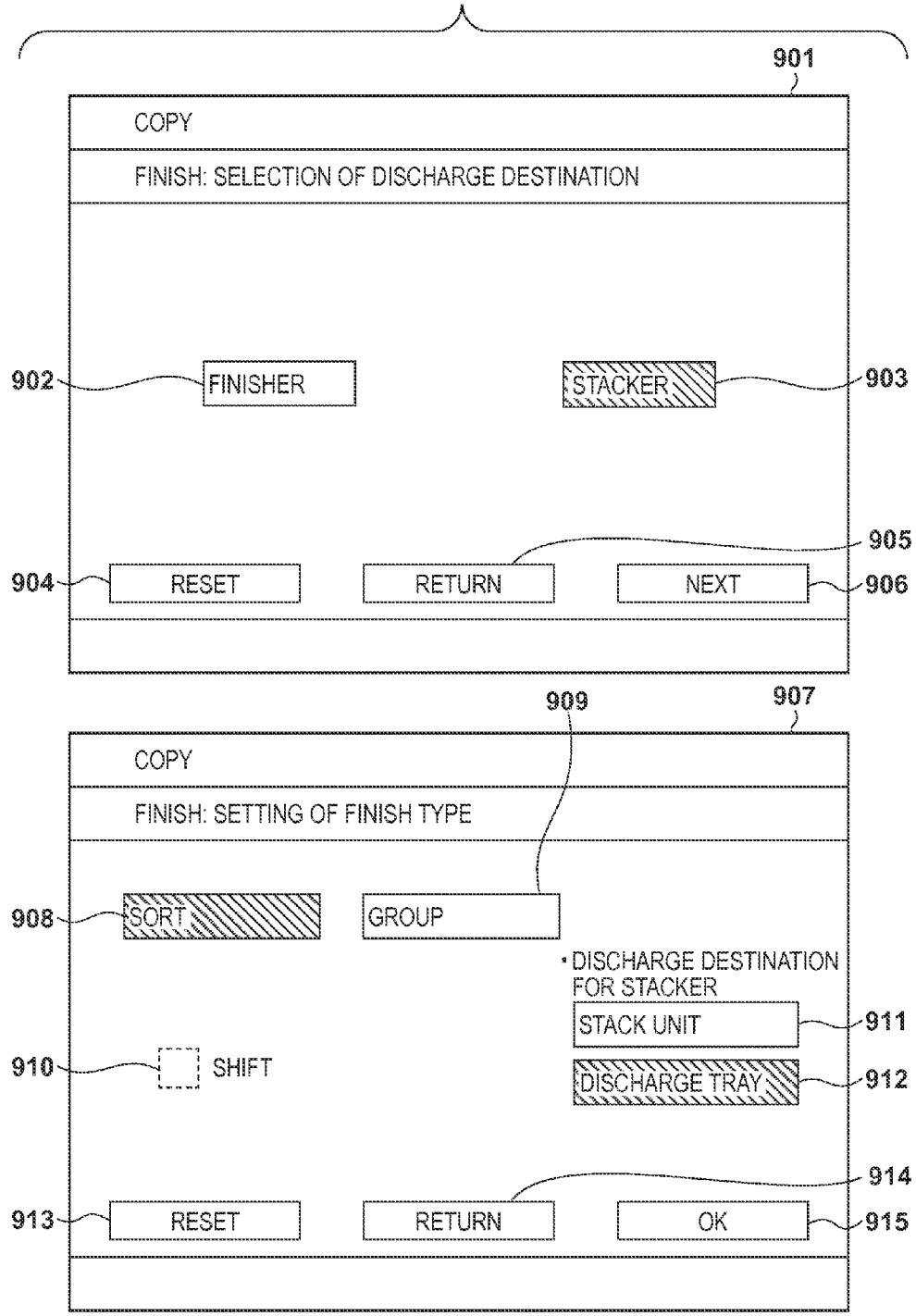
FIG. 20 shows examples of screens according to the third embodiment.

With reference to FIG. 16, a description is now given of the substance of the processing of the present subroutine. First, in step S801, the CPU 201 displays a discharge destination selection screen on the LCD 207. Reference sign 901 of FIG. 20 represents an example of the discharge destination selection screen. A finisher setting button 902, a stacker setting button 903, a reset button 904, a return button 905, and a next button 906 are arranged on the discharge destination selection screen 901.

Next, in step S802, the CPU 201 determines whether or not the discharge destination flag 223 is set. The discharge destination flag 223 is information held in the RAM 204, and has one of the following three types of values: "unset", "stack unit of stacker", and "discharge tray of stacker". If the discharge destination flag is set to "unset", the processing proceeds to step S803 (NO in the figure), and if the discharge destination flag is set to "stack unit of stacker" or "discharge tray of stacker", the processing proceeds to step S804 (YES in the figure).

In step S803, the CPU 201 places the finisher setting button 902 into the pressed status, places the stacker setting button 903 into the non-pressed status, and proceeds to the process of step S805. On the other hand, in step S804, the CPU 201 places the stacker setting button 903 into the pressed status, places the finisher setting button 902 into the non-pressed status, and proceeds to the process of step S805. In the example of the discharge destination selection screen 901 of FIG. 20, the stacker setting button 903 is in the pressed status (with shading), and the finisher setting button 902 is in the non-pressed status.

In step S805, the CPU 201 detects a change in the device status as an event. Subsequently, in step S806, the CPU 201 determines the type of the event detected in step S805. In the case where the event detected in step S805 is pressing of the finisher setting button 902 or the stacker setting button 903, the processing proceeds to step S807 (in the figure, pressing of button for changing discharge destination). If the event detected in step S805 is pressing of the next button 906, the processing proceeds to step S808. If the event detected in step S805 is pressing of the reset button 904, the processing proceeds to step S812. If the event detected in step S805 is pressing of the return button 905, the processing proceeds to step S814.

In step S807, the CPU 201 changes the display statuses of the finisher setting button 902 and the stacker setting button 903 in accordance with the pressed button that has been detected. In the case where pressing of the finisher setting button 902 has been detected, the finisher setting button 902 is displayed in the pressed status, and the stacker setting button 903 is displayed in the non-pressed status. In the case where pressing of the stacker setting button 903 has been detected, the stacker setting button 903 is displayed in the pressed status, and the finisher setting button 902 is displayed in the non-pressed status. When the process of step S807 ends, the processing returns to step S805.

Figure 17:
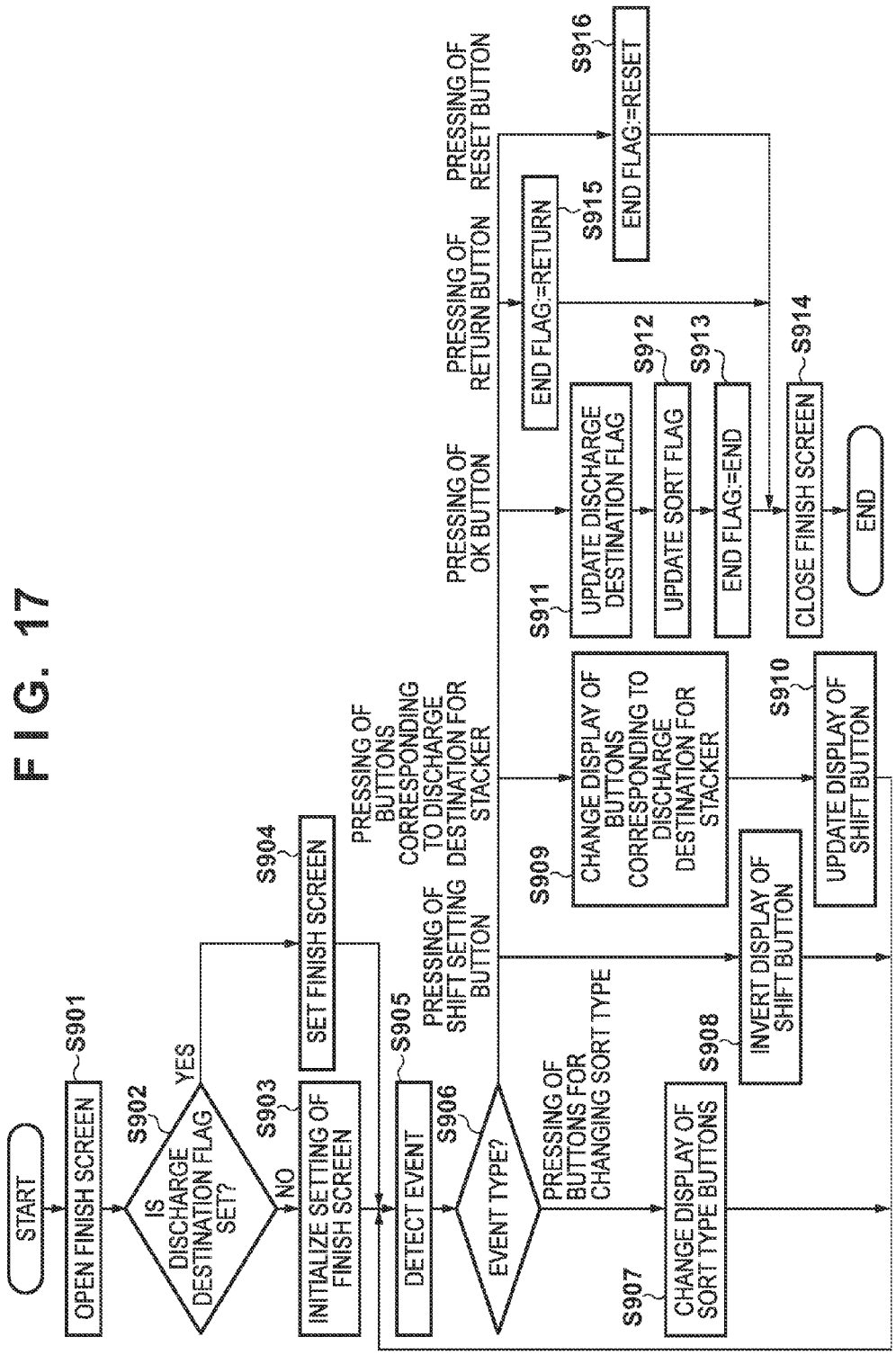
FIG. 17 is a flowchart showing the procedure of finish setting processing in the image forming apparatus according to the third embodiment.

In step S808, the CPU 201 determines whether or not the display status of the stacker setting button 903 is the pressed status. In the case where the stacker setting button 903 is displayed in the pressed status, the processing proceeds to step S809 (YES in the figure); otherwise, the processing proceeds to step S810. Step S809 is a subroutine for executing the processing for the finish setting of the stacker. The substance of the processing of this subroutine will now be described with reference to FIG. 17.

First, in step S901, the CPU 201 displays a finish screen on the LCD 207. Reference sign 907 of FIG. 20 represents an example of the finish screen. A sort setting button 908, a group setting button 909, a shift setting button 910, a stack unit setting button 911, a discharge tray setting button 912, a reset button 913, a return button 914, and an OK button 915 are arranged on the finish screen 907.

Next, in step S902, the CPU 201 makes a determination about the content of the discharge destination flag 223. If the discharge destination flag is set to "unset", the processing proceeds to step S903 (NO in the figure), and if the discharge destination flag is set to the value other than "unset" ("stack unit of stacker" or "discharge tray of stacker"), the processing proceeds to step S904 (YES in the figure).

In step S903, the CPU 201 sets the display status of the finish screen 907 to the initial display status. That is to say, the sort setting button 908 is displayed in the pressed status, and the group setting button 909 is displayed in the non-pressed status. The shift setting button 910 is displayed in the pressed status. The stack unit setting button 911 is displayed in the pressed status, and the discharge tray setting button 912 is displayed in the non-pressed status. When the process of step S903 ends, the processing proceeds to step S905.

In step S904, the CPU 201 sets the display status of the finish screen 907 in accordance with the contents of the discharge destination flag 223 and the sort flag 304. If the discharge destination flag 223 is set to "stack unit of stacker", the stack unit setting button 911 is displayed in the pressed status, and the discharge tray setting button 912 is displayed in the non-pressed status. If the discharge destination flag 223 is set to "discharge tray of stacker", the discharge tray setting button 912 is displayed in the pressed status, and the stack unit setting button 911 is displayed in the non-pressed status. In addition, if the discharge destination flag 223 is set to "discharge tray of stacker", the shift setting button 910 is displayed in the state where pressing thereof is disabled (with a dotted line in the figure). If the sort type in the sort flag 304 is "sort", the sort setting button 908 is displayed in the pressed status, and the group setting button 909 is displayed in the non-pressed status. If the sort type in the sort flag 304 is "group", the group setting button 909 is displayed in the pressed status, and the sort setting button 908 is displayed in the non-pressed status. If shift in the sort flag 304 is "ON", the shift setting button 910 is displayed in the pressed status. When the process of step S904 ends, the processing proceeds to step S905.

In step S905, the CPU 201 detects a change in the device status as an event. It should be noted that, in the case where pressing of the shift setting button 910 is disabled, even if the user presses an area corresponding to the shift setting button 910 on the LCD 207, this pressing is not detected as an event. In step S906, the CPU 201 determines the type of the event detected in step S905. In the case where the event detected in step S905 is pressing of the sort setting button 908 or the group setting button 909, the processing proceeds to step S907 (in the figure, pressing of buttons for changing sort type). If the event detected in step S905 is pressing of the shift setting button 910, the processing proceeds to step S908. If the event detected in step S905 is pressing of the stack unit setting button 911 or the discharge tray setting button 912, the processing proceeds to step S909 (in the figure, pressing of buttons corresponding to discharge destination for stacker). If the event detected in step S905 is pressing of the OK button 915, the processing proceeds to step S911. If the event detected in step S905 is pressing of the return button 914, the processing proceeds to step S915. If the event detected in step S905 is pressing of the reset button 913, the processing proceeds to step S916.

In step S907, the CPU 201 changes the display statuses of the sort setting button 908 and the group setting button 909 in accordance with the pressed button that has been detected. In the case where pressing of the sort setting button 908 has been detected, the sort setting button 908 is displayed in the pressed status, and the group setting button 909 is displayed in the non-pressed status. In the case where pressing of the group setting button 909 has been detected, the group setting button 909 is displayed in the pressed status, and the sort setting button 908 is displayed in the non-pressed status. When the process of step S907 ends, the processing returns to step S905.

In step S908, the CPU 201 inverts the display status of the shift setting button 910. If the shift setting button 910 is in the pressed status, the display status of the shift setting button 910 is switched to the non-pressed status, and if the shift setting button 910 is in the non-pressed status, the display status of the shift setting button 910 is switched to the pressed status. When the process of step S908 ends, the processing returns to step S905.

In step S909, the CPU 201 changes the display statuses of the stack unit setting button 911 and the discharge tray setting button 912 in accordance with the pressed button that has been detected. In the case where pressing of the stack unit setting button 911 has been detected, the stack unit setting button 911 is displayed in the pressed status, and the discharge tray setting button 912 is displayed in the non-pressed status. In the case where pressing of the discharge tray setting button 912 has been detected, the discharge tray setting button 912 is displayed in the pressed status, and the stack unit setting button 911 is displayed in the non-pressed status. Subsequently, in step S910, the CPU 201 changes the display status of the shift setting button 910 in accordance with the pressed button detected in step S905. In the case where pressing of the discharge tray setting button 912 has been detected, the display status of the shift setting button 910 is switched to the non-pressed status, and pressing thereof is disabled. In the case where pressing of the stack unit setting button 911 has been detected, if pressing of the shift setting button 910 is disabled, this disabled state is cancelled (the shift setting button 910 is placed into the non-pressed status). If the pressed button detected in step S905 is the stack unit setting button 911 and pressing of the shift setting button 910 is not disabled, nothing is performed. When the process of step S910 ends, the processing returns to step S905.

In step S911, the CPU 201 changes the content of the discharge destination flag 223 in accordance with the display status of the finish screen 907. If the stack unit setting button 911 is in the pressed status, the content of the discharge destination flag 223 is set to "stack unit of stacker". If the discharge tray setting button 912 is in the pressed status, the content of the discharge destination flag 223 is set to "discharge tray of stacker". Subsequently, in step S912, the content of the sort flag 304 is changed in accordance with the display status of the finish screen 907. If the sort setting button 908 is in the pressed status, the sort type in the sort flag 304 is set to "sort". If the group setting button 909 is in the pressed status, the sort type in the sort flag 304 is set to "group". If the shift setting button is in the pressed status, shift in the sort flag 304 is set to "ON", and if the shift setting button is in the non-pressed status or in the state where pressing thereof is disabled, shift in the sort flag 304 is set to "OFF". Next, in step S913, the CPU 201 sets the end flag 224 to "end", and proceeds to the process of step S914. The end flag 224 indicates the end status of the present subroutine, and has one of the following values: "end", "return", and "reset".

In step S915, the CPU 201 sets the end flag 224 to "return", and proceeds to the process of step S914. In step S916, the CPU 201 sets the end flag 224 to "reset", and proceeds to the process of step S914.

In step S914, the CPU 201 places the finish screen 907 into the undisplayed status (resulting in the status in which the discharge destination selection screen 901 is displayed). After step S914, the subroutine for executing the processing for the finish setting of the stacker ends, and the processing proceeds to step S811. This concludes the description of the substance of the processing of the subroutine in step S809.

Figure 21:
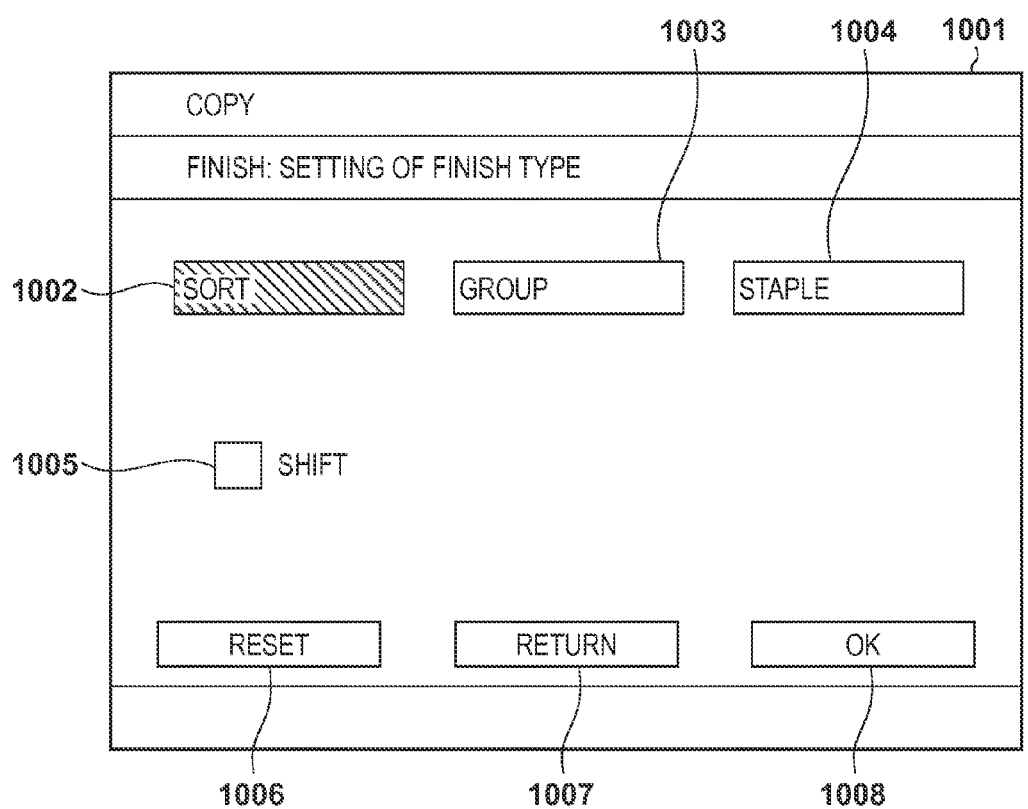
FIG. 21 shows an example of a screen according to the third embodiment.

The description of FIG. 16 is now resumed. In step S810, the CPU 201 executes a subroutine for the processing for the finish setting of the finisher. In the present subroutine, a finish screen 1001 for the finisher shown in FIG. 21 is displayed, and the discharge destination flag 223, the sort flag 304, and the end flag 224 are set. The details of the processing will be omitted as they can be understood by analogy to FIGS. 17 and 5. It should be noted that, in the case where pressing of the OK button 1008 has been detected, the discharge destination flag 223 is set to "unset". When the process of step S810 ends, the processing proceeds to step S811.

In step S811, the CPU 201 makes a determination about the content of the end flag 224. If the end flag 224 is set to "return", the processing proceeds to step S805. If the end flag 224 is set to "end", the processing proceeds to step S814. If the end flag 224 is set to "reset", the processing proceeds to step S812.

In step S812, the CPU 201 sets the discharge destination flag 223 to "unset". Subsequently, in step S813, the CPU 201 sets the sort type in the sort flag 304 to "no sort", and sets shift in the sort flag 304 to "OFF". When the process of step S813 ends, the processing proceeds to step S814. In step S814, the CPU 201 places the discharge destination selection screen 901 into the undisplayed status (resulting in the status in which the copy basic screen 401 is displayed), and ends the processing (returns to the process of step S101).

<Auto Setting Processing>

Figure 18:
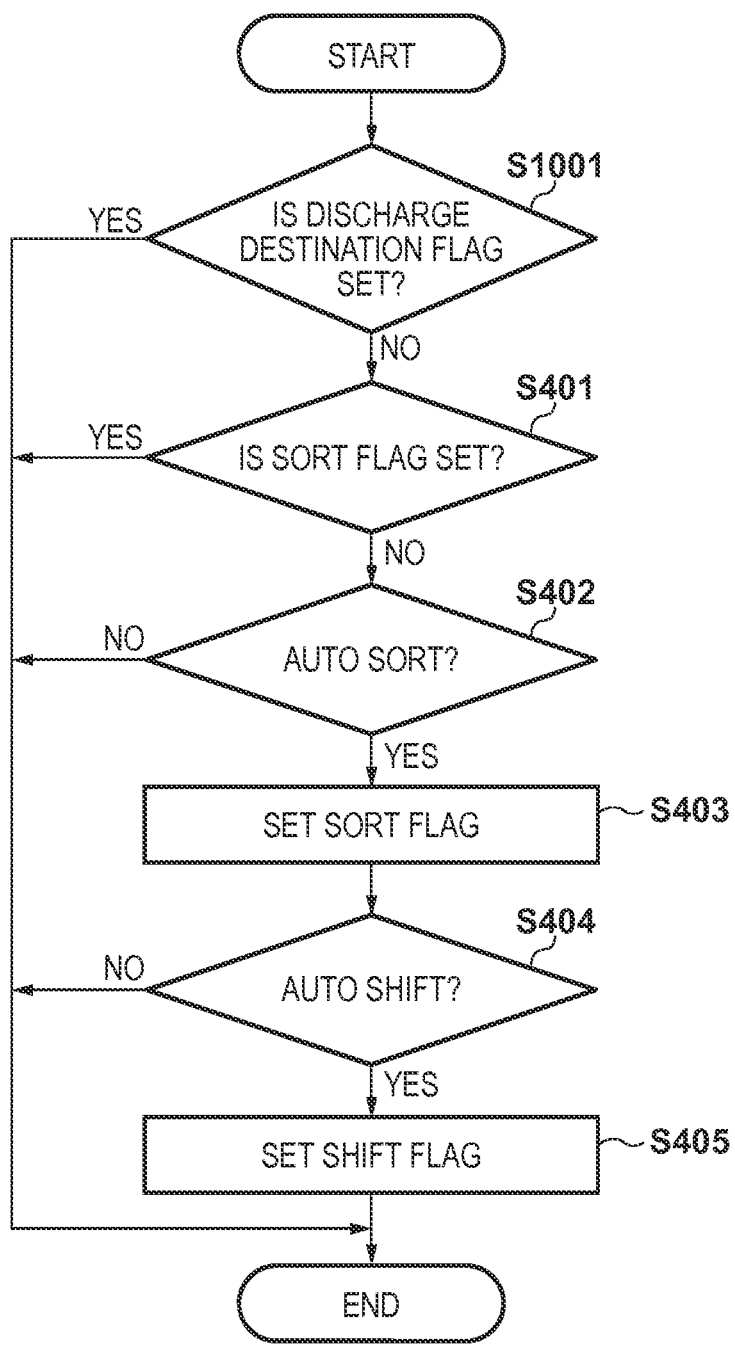
FIG. 18 is a flowchart showing the procedure of auto setting processing in the image forming apparatus according to the third embodiment.

In the present embodiment, the substance of the processing of the subroutine in step S105 for the case in which the originals have been detected complies with a flowchart of FIG. 18. Below, only the process in the flowchart of FIG. 18 that is different from FIG. 6 will be described; similar processes, that is to say, the processes from step S401 to step S405 will be given the same reference signs, and a description thereof will be omitted. In step S1001, the CPU 201 makes a determination about the content of the discharge destination flag 223. If the discharge destination flag 223 is set to "unset", the processing proceeds to step S401 (NO in the figure); otherwise, the subroutine ends (YES in the figure).

<Start Processing>

Figure 19:
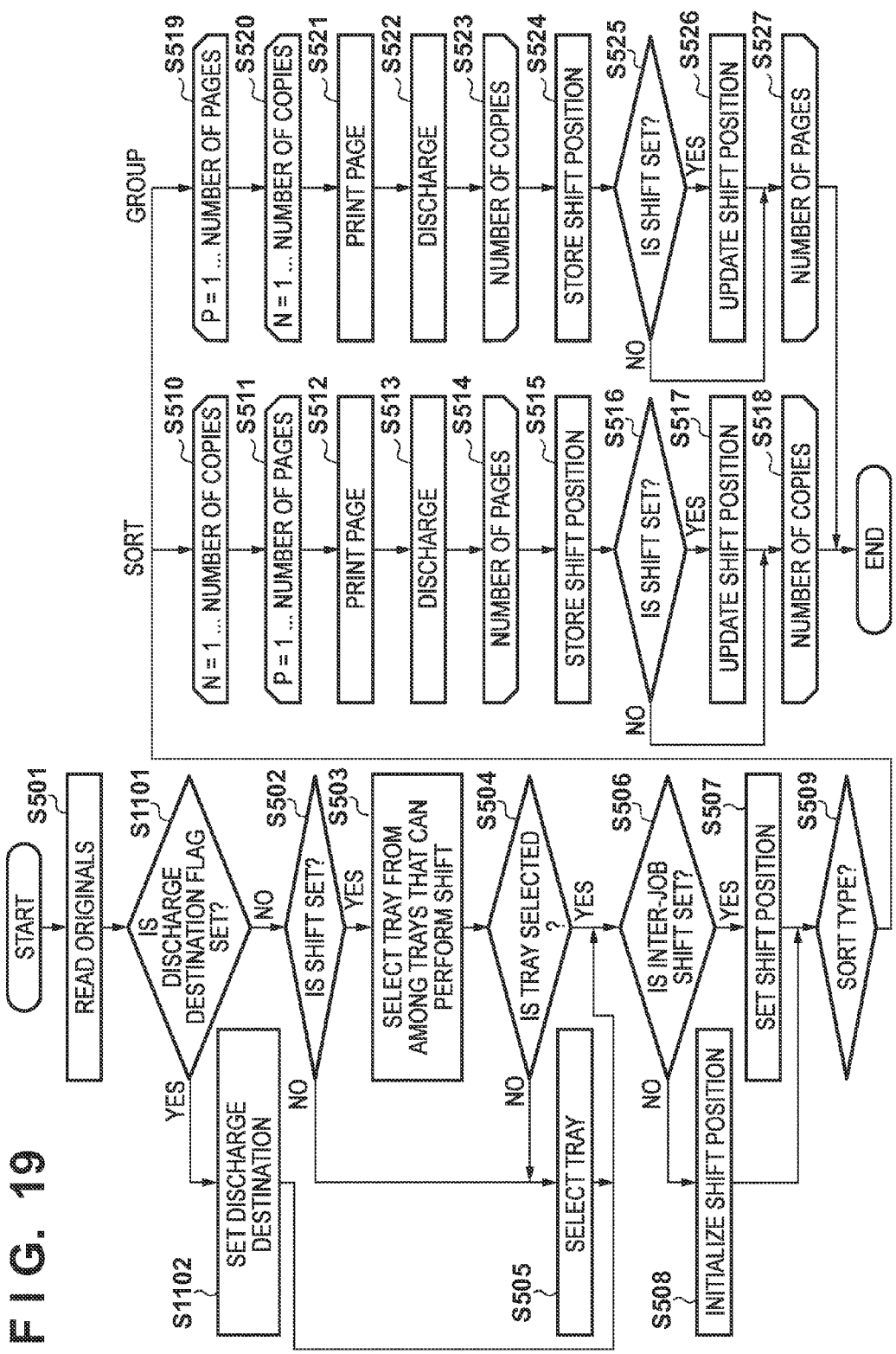
FIG. 19 is a flowchart showing the procedure of start processing in the image forming apparatus according to the third embodiment.

Furthermore, in the present embodiment, the substance of the processing of the subroutine in step S107 for the case in which the start key 216 has been pressed complies with a flowchart of FIG. 19. Below, only the portions of the flowchart of FIG. 19 that are different from FIG. 7 will be described; similar processes, that is to say, the processes from step S501 to step S527 will be given the same reference signs, and a description thereof will be omitted. After step S501, the CPU 201 proceeds to step S1101 and makes a determination about the content of the discharge destination flag 223. If the discharge destination flag 223 is set to "unset", the processing proceeds to step S502 (NO in the figure); otherwise, the processing proceeds to step S1102 (YES in the figure). In step S1102, the CPU 201 sets the discharge destination 221 in the RAM 204 to match the content of the discharge destination flag 223. When the process of step S1102 ends, the processing proceeds to step S506. The processes of step S502 and step S506 onward are similar to FIG. 7.

As described above, in the present embodiment, in the case where the user has designated a discharge destination with the stack unit setting button 911 or the discharge tray setting button 912, discharge is performed using the discharge destination designated by the user regardless of the content of the auto sort flag 301.

Other Embodiments

While the above-described embodiments have aimed at the shift function, the present invention is also applicable to any discharge function other than shift. For example, the present invention is also applicable to, among other discharge functions, a sheet alignment function for aligning the edges of sheets at the time of discharge. In this case, for example, the first discharge function is a function for aligning sheets of predetermined types on a type-by-type basis during the execution of a single job, whereas the second discharge function is a function for aligning sheets per unit of job during the execution of a plurality of jobs. Furthermore, while the present invention is not applied to stapling in the above-described first embodiment, the present invention is also applicable to stapling.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-070083 filed on Mar. 28, 2014, which is hereby incorporated by reference herein in its entirety.

What is claimed is:

1. An image forming apparatus, comprising:
   a detecting unit configured to detect an original which has been placed on a document feeder;
   a reading unit configured to read an image of the original detected by the detecting unit;
   a printing unit configured to print the image read by the reading unit on a sheet;
   a setting unit configured to set, based on a user instruction, whether or not to automatically enable a shift function for shifting the sheet on which the image is printed by the printing unit in response to detection of the original by the detecting unit; and
   a controller configured to automatically enable, in a case where automatically enabling the shift function is set by the setting unit, the shift function in response to detection of the original by the detecting unit, and to determine a discharge destination to which the sheet is discharged,
   wherein the controller is configured not to automatically enable, in a case where automatically enabling the shift function is not set by the setting unit, the shift function in response to detection of the original by the detecting unit, and is configured to determine, in a case where automatically enabling the shift function is set by the setting unit, the discharge destination from among discharge destinations where the sheet can be shifted, and
   wherein the controller determines the discharge destination to which the sheet is discharged further based on a priority order of the discharge destinations.

2. The image forming apparatus according to claim 1, wherein the priority order of the discharge destinations is set for each type of jobs executed by the image forming apparatus.

3. The image forming apparatus according to claim 1, wherein the priority order of the discharge destinations is set based on a user instruction.

4. A control method for controlling an image forming apparatus, comprising:
   detecting an original which has been placed on a document feeder;
   reading an image of the detected original;
   printing the read image on a sheet;
   setting, based on a user instruction, whether or not to automatically enable a shift function for shifting the sheet on which the image is printed in response to detection of the original;
   automatically enabling, in a case where automatically enabling the shift function is set, the shift function in response to detection of the original; and
   determining, in a case where automatically enabling the shift function is set, a discharge destination to which the sheet is discharged from among discharge destinations where the sheet can be shifted, based on a priority order of the discharge destinations,
   wherein, in a case where automatically enabling the shift function is not set, the shift function is not automatically enabled in response to detection of the original.

5. A non-transitory computer readable storage medium for storing a computer program for executing a control method for controlling an image forming apparatus, the computer program comprising:
   a code to detect an original which has been placed on a document feeder;
   a code to read an image of the detected original;
   a code to print the read image on a sheet;
   a code to set, based on a user instruction, whether or not to automatically enable a shift function for shifting the sheet on which the image is printed in response to detection of the original;
   a code to automatically enable, in a case where automatically enabling the shift function is set, the shift function in response to detection of the original; and
   a code to determine, in a case where automatically enabling the shift function is set, a discharge destination to which the sheet is discharged from among discharge destinations where the sheet can be shifted, based on a priority order of the discharge destinations,
   wherein, in a case where automatically enabling the shift function is not set, the shift function is not automatically enabled in response to detection of the original.

6. An image forming apparatus, comprising:
   a printing unit configured to print an image read by a reading unit on a sheet;
   a plurality of discharge destinations to which the sheet, on which the image is printed by the printing unit, is capable of being discharged;
   a priority order setting unit configured to set priority orders indicating which of the plurality of discharge destinations to use in priority over other discharge destinations;
   a discharge function setting unit configured to set a shift discharge function;
   a storage unit configured to store function information that indicates, with respect to each one of the plurality of discharge destinations, whether or not the shift discharge function is executable;

a selection unit configured to, if the shift discharge function is set, select a discharge destination with priority based on the setting of the shift discharge function over the priority orders set by the priority order setting unit, and if the shift discharge function is not set, select a discharge destination with priority based on the priority orders set by the priority order setting unit over the setting of the shift discharge function; and a control unit configured to perform control so as to discharge the sheet to the discharge destination selected by the selection unit.

7. The image forming apparatus according to claim 6, further comprising:

an auto setting unit configured to set an auto setting flag indicating whether or not auto setting of the shift discharge function is configured; and an original detection unit configured to detect placement of an original on the image forming apparatus, wherein the discharge function setting unit sets the shift discharge function in a case where the original detection unit has detected the original and the auto setting flag indicates that the auto setting is configured.

8. The image forming apparatus according to claim 7, wherein the following values are settable in the auto setting flag:

a value indicating that the auto setting is configured, a value indicating that the auto setting is not configured, and a value indicating that the auto setting is configured optionally, wherein in a case where the value indicating that the auto setting is configured is set in the auto setting flag, the discharge function setting unit sets the shift discharge function to be valid, wherein in a case where the value indicating that the auto setting is not configured is set in the auto setting flag, the discharge function setting unit sets the shift discharge function to be invalid, and wherein in a case where the value indicating that the auto setting is configured optionally is set in the auto setting flag, the discharge function setting unit sets the shift discharge function to be valid if the function information indicates that the shift discharge function is executable with respect to a discharge destination with the highest priority order, and sets the shift discharge function to be invalid if the function information indicates that the shift discharge function is not executable with respect to the discharge destination with the highest priority order.

9. The image forming apparatus according to claim 6, further comprising a discharge destination setting unit configured to set a discharge destination, wherein if a discharge destination is set by the discharge destination setting unit, the selection unit selects the set discharge destination regardless of the setting of the shift discharge function and the priority orders.

10. The image forming apparatus according to claim 6, wherein in a case where the setting of the shift discharge function is given priority over the priority orders in selection of a discharge destination, the selection unit selects a discharge destination with the highest priority order from among discharge destinations that are indicated by the function information as discharge destinations having the shift discharge function, and in a case where the priority orders are given priority over the setting of the shift discharge function in selection of a discharge destination, the selection unit selects a discharge destination with the highest priority order.

11. The image forming apparatus according to claim 6, further comprising a unit configured to set the shift discharge function by means of user input.

12. A method for controlling an image forming apparatus with a plurality of discharge destinations to which a sheet is capable of being discharged, the method comprising:

setting priority orders indicating which of the plurality of discharge destinations to use in priority over other discharge destinations;

setting a shift discharge function;

storing function information that indicates, with respect to each one of the plurality of discharge destinations, whether or not the shift discharge function is executable;

selecting a discharge destination with priority based on the setting of the shift discharge function over the priority orders set by the priority order setting step if the shift discharge function is set, and selecting a discharge destination with priority based on the priority orders set by the priority order setting step over the setting of the shift discharge function if the shift discharge function is not set; and performing control so as to discharge the sheet to the selected discharge destination.

13. A non-transitory computer-readable storage medium storing a computer program for causing a computer to execute the processing of the control method for controlling an image forming apparatus with a plurality of discharge destinations to which a sheet is capable of being discharged, the computer program comprising:

a code to set priority orders indicating which of the plurality of discharge destinations to use in priority over other discharge destinations;

a code to set a shift discharge function;

a code to store function information that indicates, with respect to each one of the plurality of discharge destinations, whether or not the shift discharge function is executable;

a code to select a discharge destination with priority based on the setting of the shift discharge function over the priority orders set in the code to set priority orders if the shift discharge function is set, and selecting a discharge destination with priority based on the priority orders set in the code to set priority orders over the setting of the shift discharge function if the shift discharge function is not set; and a code to perform control so as to discharge the sheet to the selected discharge destination.

* * * * *